United States Patent
Ito et al.

(10) Patent No.: US 11,358,354 B2
(45) Date of Patent: *Jun. 14, 2022

(54) PROCESS FOR PRODUCING PLASTIC LENS AND APPARATUS FOR PRODUCING PLASTIC LENS

(71) Applicant: MITSUI CHEMICALS, INC., Tokyo (JP)

(72) Inventors: Shinsuke Ito, Omuta (JP); Kouji Suesugi, Arao (JP); Masayuki Furuya, Arao (JP); Takeshi Nishimura, Yanagawa (JP); Mamoru Tanaka, Fukuoka (JP)

(73) Assignee: MITSUI CHEMICALS, INC., Tokyo (JP)

( * ) Notice: Subject to any disclaimer, the term of this patent is extended or adjusted under 35 U.S.C. 154(b) by 14 days.

This patent is subject to a terminal disclaimer.

(21) Appl. No.: 15/735,706

(22) PCT Filed: Jun. 13, 2016

(86) PCT No.: PCT/JP2016/067508
§ 371 (c)(1),
(2) Date: Dec. 12, 2017

(87) PCT Pub. No.: WO2016/204111
PCT Pub. Date: Dec. 22, 2016

(65) Prior Publication Data
US 2019/0091953 A1    Mar. 28, 2019

(30) Foreign Application Priority Data

Jun. 15, 2015 (JP) .............................. JP2015-120599

(51) Int. Cl.
*B29D 11/00* (2006.01)
*B29B 7/32* (2006.01)
(Continued)

(52) U.S. Cl.
CPC .......... *B29D 11/00442* (2013.01); *B29B 7/04* (2013.01); *B29B 7/16* (2013.01);
(Continued)

(58) Field of Classification Search
CPC ........ B29D 11/00442; B29D 11/00413; B29D 11/00432; B29D 11/00538; B29C 39/24;
(Continued)

(56) References Cited

U.S. PATENT DOCUMENTS 3,894,024 A    7/1975   Cherenko et al.
4,775,733 A   10/1988   Kanemura et al.
(Continued)

FOREIGN PATENT DOCUMENTS

CN    101809055 A    8/2010
CN    103483521 A    1/2014
(Continued)

OTHER PUBLICATIONS

Technical Handbook for Plastic Application, Chapter XI Thermosetting Plastics, May 2013 (16 pages including partial English translation).
(Continued)

*Primary Examiner* — Mathieu D Vargot
(74) *Attorney, Agent, or Firm* — Buchanan, Ingersoll & Rooney PC

(57) ABSTRACT

A process for producing a plastic lens includes a step of stirring and mixing a solution including a polymerization reactive compound in a preparation tank; a step of transferring the polymerizable composition obtained in the step from the preparation tank to a lens casting mold; a step of curing the polymerizable composition; and a step of obtaining a plastic lens molded product by separating the obtained resin from the lens casting mold. The step of transferring the polymerizable composition includes a step of re-mixing the (Continued)

polymerizable composition discharged from the preparation tank and injecting the polymerizable composition into the lens casting mold.

9 Claims, 2 Drawing Sheets

(51) Int. Cl.

| | | |
|---|---|---|
| C08G 18/61 | (2006.01) | |
| G02B 1/04 | (2006.01) | |
| C08G 18/75 | (2006.01) | |
| C08G 18/24 | (2006.01) | |
| C08G 18/38 | (2006.01) | |
| G02B 3/00 | (2006.01) | |
| B29C 39/24 | (2006.01) | |
| B29B 7/16 | (2006.01) | |
| B29B 7/74 | (2006.01) | |
| B29C 39/00 | (2006.01) | |
| B29B 7/04 | (2006.01) | |
| B29B 7/44 | (2006.01) | |
| C08G 18/28 | (2006.01) | |
| C08G 18/65 | (2006.01) | |
| B29K 71/00 | (2006.01) | |
| B29K 75/00 | (2006.01) | |
| B29L 11/00 | (2006.01) | |
| B29K 83/00 | (2006.01) | |
| B29K 33/00 | (2006.01) | |
| C08L 83/12 | (2006.01) | |
| C08G 77/46 | (2006.01) | |

(52) U.S. Cl.
CPC ............... *B29B 7/325* (2013.01); *B29B 7/44* (2013.01); *B29B 7/7461* (2013.01); *B29B 7/7466* (2013.01); *B29B 7/7485* (2013.01); *B29C 39/006* (2013.01); *B29C 39/24* (2013.01); *B29D 11/00413* (2013.01); *B29D 11/00432* (2013.01); *B29D 11/00538* (2013.01); *C08G 18/242* (2013.01); *C08G 18/284* (2013.01); *C08G 18/3851* (2013.01); *C08G 18/3876* (2013.01); *C08G 18/61* (2013.01); *C08G 18/65* (2013.01); *C08G 18/758* (2013.01); *G02B 1/04* (2013.01); *G02B 1/041* (2013.01); *G02B 3/00* (2013.01); *B29K 2033/08* (2013.01); *B29K 2071/00* (2013.01); *B29K 2075/00* (2013.01); *B29K 2083/00* (2013.01); *B29L 2011/0016* (2013.01); *C08G 77/46* (2013.01); *C08L 83/12* (2013.01)

(58) Field of Classification Search
CPC .......... B29C 39/006; G02B 1/04; G02B 3/00; B29B 7/04; B29B 7/16; B29B 7/325; B29B 7/44; C08G 18/61; C08G 18/758; C08G 18/242; C08G 18/3876; C08G 18/284
See application file for complete search history.

(56) References Cited

U.S. PATENT DOCUMENTS

| | | | | |
|---|---|---|---|---|
| 6,056,900 | A * | 5/2000 | Shimizu | C08F 283/12 264/1.1 |
| 6,867,245 | B2 * | 3/2005 | Iwata | B29D 11/00125 264/1.32 |
| 2004/0059013 | A1 * | 3/2004 | Tanabe | C08F 290/067 522/90 |
| 2005/0270898 | A1 | 12/2005 | Verronneau et al. | |
| 2010/0102463 | A1 | 4/2010 | Arnet | |
| 2010/0256313 | A1 | 10/2010 | Nakamura et al. | |
| 2010/0292430 | A1 | 11/2010 | Ryu et al. | |
| 2011/0278747 | A1 | 11/2011 | Okamoto et al. | |
| 2013/0242393 | A1 * | 9/2013 | Ryu | G02B 1/08 359/488.01 |
| 2015/0284556 | A1 | 10/2015 | Sugiyama et al. | |
| 2016/0122533 | A1 * | 5/2016 | Tomita | G02B 1/045 428/220 |
| 2016/0237198 | A1 | 8/2016 | Tsukada et al. | |
| 2016/0282515 | A1 | 9/2016 | Tsukada et al. | |
| 2017/0166737 | A1 * | 6/2017 | Adachi | G03F 7/094 |
| 2018/0022860 | A1 * | 1/2018 | Ito | G02B 1/041 528/18 |

FOREIGN PATENT DOCUMENTS

| | | |
|---|---|---|
| CN | 104387788 A | 3/2015 |
| EP | 1967258 A1 | 9/2008 |
| JP | 52-077975 U1 | 6/1977 |
| JP | 53-094964 U1 | 8/1978 |
| JP | S57-36412 Y2 | 8/1982 |
| JP | 63-046213 A | 2/1988 |
| JP | 03-081320 A | 4/1991 |
| JP | 09-055119 A | 2/1997 |
| JP | 2006-241447 A | 9/2006 |
| JP | 2007-090574 A | 4/2007 |
| JP | 2007-261054 A | 10/2007 |
| JP | 2007-301776 A | 11/2007 |
| JP | 2009-169391 A | 7/2009 |
| JP | 2009-226742 A | 10/2009 |
| JP | 2009-256585 A | 11/2009 |
| JP | 2010-214754 A | 9/2010 |
| JP | 2011-207152 A | 10/2011 |
| JP | 2012-071556 A | 4/2012 |
| JP | 2014-141033 A | 8/2014 |
| JP | 2014-166706 A | 9/2014 |
| WO | WO 2010/047168 A1 | 4/2010 |
| WO | WO 2010/050239 A1 | 5/2010 |
| WO | 2014/069332 A1 | 5/2014 |
| WO | WO 2015/060260 A1 | 4/2015 |

OTHER PUBLICATIONS

Office Action issued by the Chinese Patent Office in corresponding Chinese Patent Application No. 201680032219.7 dated Feb. 1, 2019 (13 pages).
Extended Search Report issued by the European Patent Office in corresponding European Patent Application No. 16811585.5-1014 dated Jan. 24, 2019 (12 pages).
International Search Report (PCT/ISA/210) dated Sep. 6, 2016, by the Japanese Patent Office as the International Searching Authority for International Application No. PCT/JP2016/067508.
Written Opinion (PCT/ISA/237) dated Sep. 6, 2016, by the Japanese Patent Office as the International Searching Authority for International Application No. PCT/JP2016/067508.

* cited by examiner

PROCESS FOR PRODUCING PLASTIC LENS AND APPARATUS FOR PRODUCING PLASTIC LENS

TECHNICAL FIELD

The present invention relates to a process for producing a plastic lens and an apparatus for producing a plastic lens.

BACKGROUND ART

In comparison with inorganic lenses, plastic lenses have a higher refractive index and a higher Abbe number, are lighter and harder to break, and are able to be dyed and have thus rapidly become widespread in optical materials such as spectacle lenses and camera lenses. Various molded products for lenses have been developed and used and representative examples thereof include optical molded products obtained from a polymerizable composition including an isocyanate compound and a thiol compound (Patent Document 1).

In general, plastic lenses are produced by a casting polymerization method in which a polymerizable composition is prepared by stirring and mixing a polymerization reactive compound (referred to below as a polymerization monomer or a monomer), additives, and the like in one preparation tank, and then the polymerizable composition is injected inside a cavity of a lens mold formed by a glass mold and a tape or a resin gasket and then polymerized and cured by heating or being irradiated with radiation.

One of the most difficult problems to be solved when producing plastic lenses is striae. It is thought that striae may be caused by injection striations when the polymerizable composition is injected into the lens mold, or may be caused by flow striations due to the convection of the polymerizable composition that resulted from influences such as heat generated by the monomer and temperature differences with the surroundings during polymerization, or the like.

In a case where a plastic lens is industrially produced in large quantities, the polymerizable composition is usually transported from the preparation tank to the injection nozzle to the lens mold by a resin pipe or the like. At the time, particularly in a polymerizable composition having a short pot life or a polymerizable composition having a high viscosity at the time of blending, there is a problem in that injection striations are generated, which causes striae. In particular, in a case where a large amount of these polymerizable compositions are prepared in the industrial production of plastic lenses, there are problems in that striae caused by the injection striations tend to occur and the yield of products in the lens production is decreased.

In order to solve such a problem, a plastic lens producing method has been proposed in which, in a case of using two or more kinds of polymerization monomers, the polymerization monomers are transferred from the respective polymerization monomer storage tanks without mixing the polymerization monomers beforehand by controlling the respective transfer amounts by the ratios of the cross-sectional areas of the flow path, the polymerization monomers are mixed using a static mixer directly before the injection nozzle to the lens mold, and the polymerizable composition is injected into the lens mold from the injection nozzle directly after mixing (Patent Document 2). In addition, a plastic lens producing method has been proposed in which the mixing of the polymerization monomers in Patent Document 2 is performed by a mixer/ejector with a motor, and the polymerizable composition is continuously injected into a plurality of lens molds (Patent Document 3).

On the other hand, as a method of suppressing the striae caused by flow striations due to convection of the polymerizable composition during polymerization, curing may be carried out slowly over a long period of time such that the monomer does not flow, or underwater polymerization or the like may be performed to increase the heat conduction.

For example, methods have been disclosed such as a method in which a monomer composition is thickened to a specific range by a preliminary reaction, and then polymerized and cured by a heating polymerization program similar to a conventional producing method (Patent Document 4), a method in which a mold filled with a monomer composition is forcibly moved regularly or irregularly in the middle of a step of polymerizing and curing a monomer composition so as to eliminate unevenness of the monomer during curing and to suppress the generation of optical distortion or striae (Patent Document 5), a method of optimizing a temperature program when polymerizing a monomer composition (Patent Document 6), a method of holding and curing a monomer composition in a mold filled with the monomer composition at a specific angle from the horizontal plane when polymerizing and curing the monomer composition (Patent Document 7), and a method of polymerizing by irradiation with microwaves in a state where a mold filled with a monomer composition is immersed in a liquid (Patent Document 8).

RELATED DOCUMENT

Patent Document

[Patent Document 1] Japanese Laid-open Patent Publication No. S63-046213
[Patent Document 2] Japanese Laid-open Patent Publication No. 2014-166706
[Patent Document 3] Pamphlet of International Publication No. 2010/050239
[Patent Document 4] Japanese Laid-open Patent Publication No. 2007-90574
[Patent Document 5] Japanese Laid-open Patent Publication No. 2007-261054
[Patent Document 6] Japanese Laid-open Patent Publication No. 2009-226742
[Patent Document 7] Japanese Laid-open Patent Publication No. 2011-207152
[Patent Document 8] Japanese Laid-open Patent Publication No. 2014-141033

SUMMARY OF THE INVENTION

Technical Problem

Since even a polymerizable composition having a short pot life is able to be injected into the cavity of the lens mold immediately after monomer preparation using the conventional methods described in these Patent Documents 2 to 3, there is a possibility that it will be possible to produce a plastic lens in which striae caused by injection striations are suppressed.

However, there is a demand for the polymerizable composition for producing a plastic lens to be prepared so as to have an accurate monomer composition ratio such that the required optical properties are accurately expressed. From the viewpoint of preparing the monomer inaccurate amounts, the producing method described in Patent Document 2 has an inherent risk in that errors are likely to occur. In particular, in cases such as where there are a plurality of kinds of monomers, there is a possibility that it will be difficult to control the transfer amount of the liquid, and errors in the mixing ratio tend to occur. In addition, there is also an inherent risk that large amounts of polymerization monomer will be used wastefully until the mixing ratio is stabilized.

In a similar manner, it is considered that the same problem is inherent in the producing method of Patent Document 3, and further, there is a problem in the method of Patent Document 3 in that the initial investment in the producing apparatus is high and the production cost increases. From the viewpoint of preparing the polymerization monomer with a precise weight, a method of preparing the polymerization monomers batchwise in one preparation tank is the most convenient and, in particular, this method is the easiest method to be carried out in a case of industrially producing plastic lenses.

In addition, when the conventional method described in Patent Documents 4 to 8 is used, it is considered that it is possible to produce a plastic lens in which the striae generated by flow striations due to the convection of the polymerizable composition during polymerization are suppressed to some extent.

However, even if curing is carried out over time to suppress striae, there are many monomer compositions with which it is difficult to suppress striae sufficiently. With such a monomer composition, even if the resin physical properties are suitable, making a product may be impossible due to striae defects and the development of such products may have to be abandoned. In addition, in a case of a thermosetting resin, since the monomer preparation liquid itself has a pot life, it may not be possible to efficiently carry out production given that it is necessary to use the monomer preparation liquid within the pot life. In addition, in a case of conducting underwater polymerization known in the related art, there are problems in that expensive facility investment is necessary, the production efficiency is decreased, and the like.

Furthermore, there were cases where it was difficult to suppress the striae caused by injection striations by these methods.

Solution to Problem

The present inventors carried out research to solve the problems of the related art and found the following points as a result.

In a case where plastic lenses are industrially produced in large quantities, usually, the polymerizable composition is transported from the preparation tank to the injection nozzle to the lens mold by a resin pipe or the like. At this time, particularly with a polymerizable composition having a short pot life or a polymerizable composition having a high viscosity at the time of blending, injection striations are generated in a case of injecting the polymerizable composition into the cavity of the lens mold, which may cause striae.

Furthermore, the present inventors conducted intensive studies to solve the problems described above and, as a result, found that it is possible to stably produce a plastic lens in which striae are suppressed by preparing a polymerizable composition by mixing a plurality of polymerizable monomers in one preparation tank and then mixing the polymerizable composition again immediately before injecting the polymerizable composition into the cavity of the lens mold, thereby completing the invention.

That is, it is possible to illustrate the present invention as follows.

[1] A process for producing a plastic lens, the method including a step of stirring and mixing a solution including a polymerization reactive compound in a preparation tank; a step of transferring a polymerizable composition obtained in the step from the preparation tank to a lens casting mold; a step of curing the polymerizable composition; and a step of separating a cured resin from the lens casting mold to obtain a plastic lens molded product, in which the step of transferring the polymerizable composition includes a step of re-mixing the polymerizable composition discharged from the preparation tank and injecting the polymerizable composition into the lens casting mold.

[2] The process for producing a plastic lens according to [1], in which the step of transferring the polymerizable composition includes a step of transferring the polymerizable composition discharged from the preparation tank while carrying out re-mixing, and injecting the polymerizable composition into the lens casting mold.

[3] The process for producing a plastic lens according to [2], in which the step of transferring the polymerizable composition includes a step of passing the polymerizable composition discharged from the preparation tank inside a motionless mixer, transferring the polymerizable composition while carrying out re-mixing, and injecting the polymerizable composition into the lens casting mold.

[4] The process for producing a plastic lens according to [3], in which the motionless mixer is a static mixer.

[5] The process for producing a plastic lens according to [2], in which the step of transferring the polymerizable composition includes a step of passing the polymerizable composition discharged from the preparation tank inside a dynamic mixer, transferring the polymerizable composition while stirring and re-mixing, and injecting the polymerizable composition into the lens casting mold.

[6] The process for producing a plastic lens according to [1], in which the step of transferring the polymerizable composition includes a step of transferring the polymerizable composition discharged from the preparation tank to a mixing tank, a step of stirring and re-mixing the polymerizable composition in the mixing tank, and a step of injecting the re-mixed polymerizable composition into the lens casting mold.

[7] The process for producing a plastic lens according to any one of [1] to [6], in which the polymerization reactive compound is at least one kind of compounds selected from a polyiso(thio) cyanate compound, a (thio)epoxy compound, an oxetanyl compound, a thietanyl compound, a (meth) acryloyl compound, an alkene compound, an alkyne compound, a bifunctional or higher active hydrogen compound, and an acid anhydride.

[8] The process for producing a plastic lens according to [7], in which the polymerization reactive compound includes a polyiso(thio) cyanate compound and a bifunctional or higher active hydrogen compound.

[9] The process for producing a plastic lens according to any one of [1] to [8], in which a viscosity of the polymerizable composition in the step of injecting into the lens casting mold is 10 to 1,000 mPa·s at 20° C.

[10] The process for producing a plastic lens according to any one of [1] to [9], in which the solution in the preparation tank includes a polyether-modified compound having a polyether group represented by General Formula (4a)

$$\text{\textemdash}(R_{25}\text{\textemdash}O\text{\textemdash})_k R_{26} \tag{4a}$$

wherein, in General Formula (4a), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms, a plurality of present $R_{25}$'s may be the same as or different from each other, and k represents an integer equal to or more than 1.

[11] The process for producing a plastic lens according to [10], wherein the polyether-modified compound is at least one kind of compounds selected from a polyether-modified siloxane compound represented by General Formula (1a), a polyether-modified fluoro compound represented by General Formula (2a) and a polyether-modified (meth)acrylic compound represented by General formula (3a);

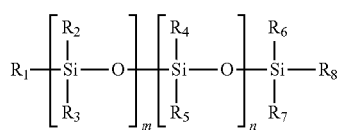
(1a)

wherein $R_1$ to $R_8$ may be the same as or different from each other and at least one of $R_1$ to $R_8$ is a polyether group represented by General Formula (4a), and the other $R_1$ to $R_8$ may be the same as or different from each other and are a linear or branched alkyl group having 1 to 20 carbon atoms, a linear or branched alkoxy group having 1 to 20 carbon atoms, a hydroxyl group, or a polysiloxy group, a plurality of present $R_2$ to $R_5$ may each be the same as or different from each other, m and n may be the same as or different from each other and are an integer equal to or more than 0,

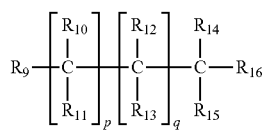
(2a)

wherein $R_9$ to $R_{16}$ may be the same as or different from each other and at least one of $R_9$ to $R_{16}$ is a polyether group represented by General Formula (4a) and at least one of $R_9$ to $R_{16}$ is a fluorine atom or a linear or branched perfluoroalkyl group having 1 to 20 carbon atoms, and the other $R_9$ to $R_{16}$ represent a linear or branched alkyl group having 1 to 20 carbon atoms, a plurality of present $R_{10}$ to $R_{13}$ may be the same as or different from each other, p and q may be the same as or different from each other and are an integer equal to or more than 0, and

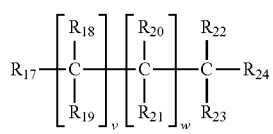
(3a)

wherein $R_{17}$ to $R_{24}$ may be the same as or different from each other, and at least one of $R_{17}$ to $R_{24}$ is a polyether group represented by General Formula (4a), and at least one of $R_{17}$ to $R_{24}$ is a (meth)acryloyl group or a linear or branched alkyl group having 1 to 20 carbon atoms and having a (meth)acryloyl group, and the other $R_{17}$ to $R_{24}$ represent a linear or branched alkyl group having 1 to 20 carbon atoms, and a plurality of present $R_{18}$ to $R_{21}$ may each be the same as or different from each other, v and w may be the same as or different from each other and represent an integer equal to or more than 0.

[12] The process for producing a plastic lens according to any one of [1] to [9], in which the solution in the preparation tank includes an ester compound represented by General Formula (1b) or an ether compound represented by General Formula (3b);

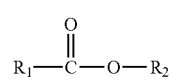
(1b)

wherein, in General Formula (1b), $R_1$ represents a hydrogen atom, a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms having one or more unsaturated bonds, and $R_2$ represents a polyoxyalkylene group represented by General Formula (2b);

$$—(CH_2CHR_3O)_nH \qquad (2b)$$

wherein, in General Formula (2b), a plurality of present $R_3$'s may be the same as or different from each other and each represents a hydrogen atom or a methyl group, and n represents an integer of 2 to 20, $$R_4—O—R_5 \qquad (3b)$$

wherein, in General Formula (3b), $R_4$ represents a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms and having one or more unsaturated bonds, $R_5$ represents a linear alkyl group having 1 to 20 carbon atoms, a branched alkyl group having 3 to 20 carbon atoms, or a (poly)oxyalkylene group represented by General Formula (4b);

$$—(CH_2CHR_6O)_mH \qquad (4b)$$

wherein, in General Formula (4b), a plurality of present $R_6$'s may be the same as or different from each other and represents a hydrogen atom or a methyl group, and m represents an integer of 1 to 20.

[13] A plastic lens obtained by the producing method according to any one of [1] to [12].

[14] An apparatus for producing a plastic lens including a preparation tank provided with a stirring unit configured to stir and mix a solution including a polymerization reactive compound to prepare a polymerizable composition, and a discharge port for discharging the obtained polymerizable composition; a lens casting mold provided with an injection port and curing the polymerizable composition transported to an interior through the injection port to obtain a molded product; a pipe for connecting the discharge port and the injection port to each other and transporting the polymerizable composition in the preparation tank into the lens casting mold; and a mixing unit installed in at least a part of the pipe and configured to re-mix the polymerizable composition discharged from the preparation tank and inject the polymerizable composition into the lens casting mold.

[15] The apparatus for producing the plastic lens according to [14], in which the mixing unit is a motionless mixer or a dynamic mixer which transfers the polymerizable composition discharged from the preparation tank while mixing and injects the polymerizable composition into the lens casting mold.

[16] The apparatus for producing the plastic lens according to [15], in which the motionless mixer is a static mixer.

[17] The apparatus for producing the plastic lens according to [14], in which the mixing unit is a mixing tank provided with a stirring unit configured to re-mix the polymerizable composition and a discharge port for injecting the re-mixed polymerizable composition into the lens casting mold.

In the present invention, the re-mixing of the polymerizable composition does not mean mixing different raw materials into the polymerizable composition, but means re-stirring in order to make the mixing state or the like of the polymerizable composition uniform again, or passing the polymerizable composition through a motionless mixer such as a static mixer. Here, it does not exclude adding other raw materials and additives separately to the polymerizable composition and carrying out mixing.

Advantageous Effects of Invention

According to the present invention, since the polymerization monomers to be used are stirred and mixed in one preparation tank, it is possible to suppress the occurrence of an error in the composition ratio to the minimum, and it is possible to remarkably reduce the striae caused by injection striations by stirring again immediately before injection into the cavity of the lens mold even with a polymerizable composition which has a short pot life and easily increases in viscosity or a polymerizable composition which has a high in viscosity during preparation. Therefore, the product yield is greatly improved. Furthermore, the obtained plastic lens is also excellent in qualities such as optical properties.

In addition, even in the case of preparing a polymerizable composition having a short pot life in an existing preparation equipment, or even in the case of using a polymerizable composition which has a high viscosity during preparation, applying the method or the apparatus of the present invention makes possible to improve existing equipment with a minimum investment. The present invention is a method or apparatus which is able to be widely applied to the existing preparation equipment of lens manufacturers and which makes possible to produce plastic lenses with a stable quality from various polymerizable compositions by utilizing existing equipment.

BRIEF DESCRIPTION OF THE DRAWINGS

The object described above, other objects, features and advantages will become more apparent from the following description of the preferred embodiments and the accompanying drawings.

DESCRIPTION OF EMBODIMENTS

Figure 1:
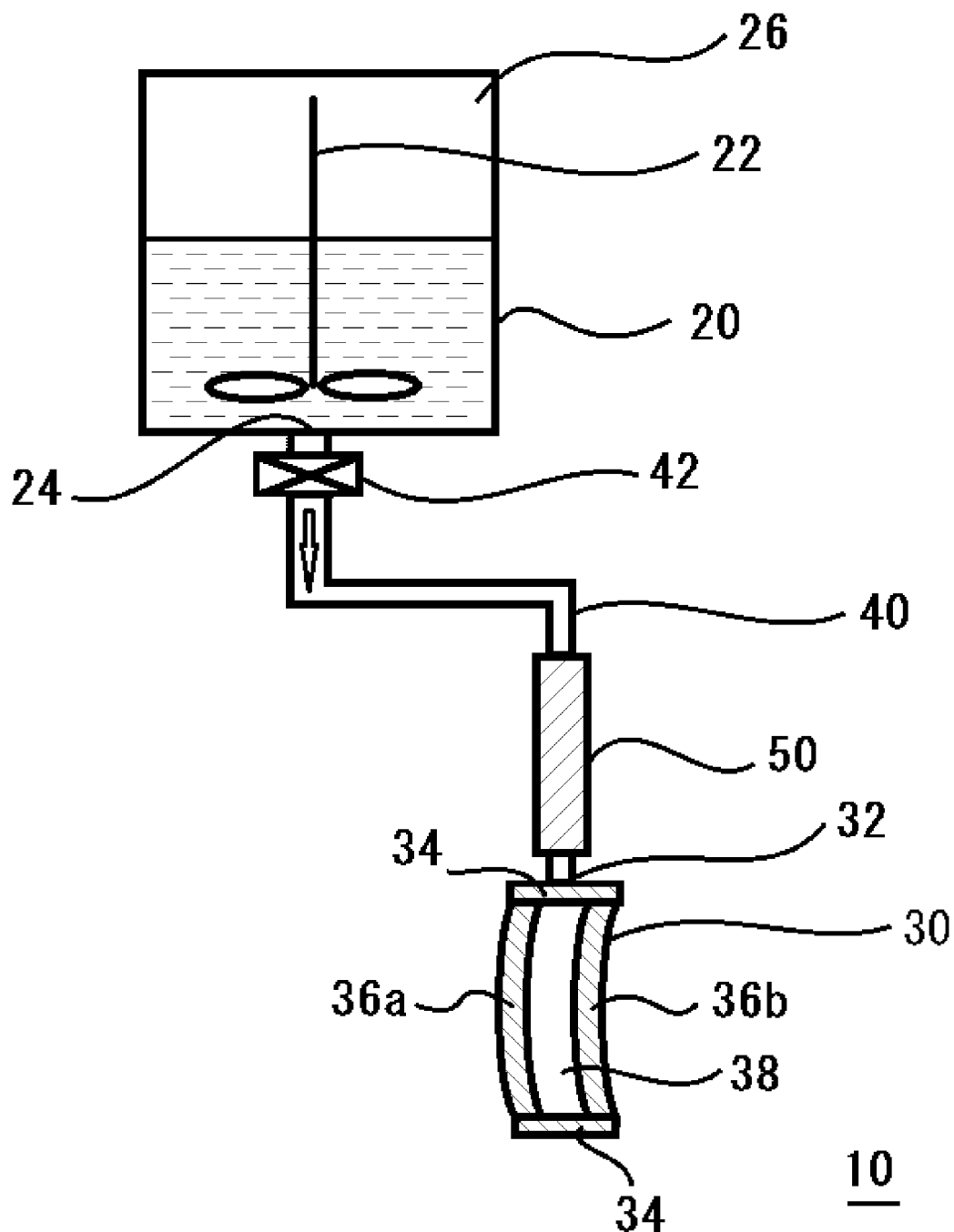
FIG. 1 is a cross-sectional view schematically showing an apparatus for producing a plastic lens used in a first embodiment.

A process for producing a plastic lens according to the present invention includes a step of stirring and mixing a solution including a polymerization reactive compound in a preparation tank; a step of transferring a polymerizable composition obtained in the step from the preparation tank to a lens casting mold; a step of curing the polymerizable composition in the lens casting mold; and a step of separating a cured resin from the lens casting mold to obtain a plastic lens molded product.

The step of transferring the polymerizable composition includes a step of re-mixing the polymerizable composition discharged from the preparation tank and injecting the polymerizable composition into the lens casting mold.

Description will be given below of the present invention based on embodiments.

[Polymerization Reactive Compound]

The polymerization reactive compound includes a polymerization reactive compound which has at least one polymerizable functional group which is able to be self-polymerized, copolymerized or addition-polymerized in the presence or absence of additives such as initiators and catalysts to be added as necessary.

Examples of the polymerization reactive compound include a polyiso(thio)cyanate compound having two or more isocyanate groups or isothiocyanate groups, a (thio) epoxy compound having one or more epoxy groups or thioepoxy groups, an oxetanyl compound having one or more oxetanyl groups, a thietanyl compound having one or more thietanyl groups or having an oxetanyl group and a thietanyl group, a (meth)acryloyl compound having one or more methacryloyloxy groups, acryloyloxy groups, methacryloylthio groups, acryloylthio groups, methacrylamide groups, or acrylamide groups, an alkene compound having one or more polymerizable carbon-carbon double bond group other than a methacryloyloxy group, an acryloyloxy group, a methacryloylthio group, an acryloylthio group, a methacrylamide group, or an acrylamide group, alkyne compounds having one or more polymerizable carbon-carbon triple bond groups, a bifunctional or higher active hydrogen compound, an acid anhydride having one or more acid anhydride groups, and the like, and it is possible to use one kind or two or more kinds selected therefrom.

Examples of the polyiso(thio) cyanate compound include aliphatic polyisocyanate compounds such as tetramethylene diisocyanate, pentamethylene diisocyanate, hexamethylene diisocyanate, heptamethylene diisocyanate, octamethylene diisocyanate, 2,2,4-trimethylhexamethylene diisocyanate, 2,4,4-trimethylhexamethylene diisocyanate, lysine diisocyanate methylester, lysine triisocyanate, and xylylene diisocyanate;

alicyclic polyisocyanate compounds such as isophorone diisocyanate, bis(isocyanatomethyl)cyclohexane, bis(isocyanatocyclohexyl)methane, dicyclohexyldimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane;

aromatic polyisocyanate compounds such as tolylene diisocyanate, 4,4'-diphenylmethane diisocyanate, diphenylsulfide-4,4-diisocyanate, and phenylene diisocyanate;

heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane;

aliphatic polyisothiocyanate compounds such as hexamethylene diisothiocyanate, lysine diisothiocyanate methylester, lysine triisothiocyanate, m-xylylene diisothiocyanate, bis(isothiocyanatomethyl)sulfide, bis(isothiocyanatoethyl) sulfide, and bis(isothiocyanatoethyl)disulfide;

alicyclic polyisothiocyanate compounds such as isophorone diisothiocyanate, bis(isothiocyanatomethyl)cyclohexane, bis(isothiocyanatocyclohexyl)methane, cyclohexane diisothiocyanate, methylcyclohexane diisothiocyanate, 2,5-bis(isothiocyanatomethyl)bicyclo-[2.2.1]-heptane, 2,6-bis(isothiocyanatomethyl)bicyclo-[2.2.1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, and 4,9-bis(isothiocyanatomethyl)tricyclodecane;

aromatic polyisothiocyanate compounds such as tolylene diisothiocyanate, 4,4-diphenylmethane diisothiocyanate, and diphenyldisulfide-4,4-diisothiocyanate;

sulfur-containing heterocyclic polyisothiocyanate compounds such as 2,5-diisothiocyanatothiophene, 2,5-bis(isothiocyanatomethyl)thiophene, 2,5-isothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanato-1,4-dithiane, 2,5-bis(isothiocyanatomethyl)-1,4-dithiane, 4,5-diisothiocyanato-1,3-dithiolane, and 4,5-bis(isothiocyanatomethyl)-1,3-dithiolane; and the like.

Examples of (thio)epoxy compounds include polyepoxy compounds such as bisphenol A diglycidylether; chained aliphatic 2,3-epoxypropylthio compounds such as bis(2,3-epoxypropyl)sulfide, bis(2,3-epoxypropyl)disulfide, bis(2,3-epoxypropylthio)methane, 1,2-bis(2,3-epoxypropylthio)ethane, 1,2-bis(2,3-epoxypropylthio)propane, 1,3-bis(2,3-epoxypropylthio)propane, 1,3-bis(2,3-epoxypropylthio)-2-methylpropane, 1,4-bis(2,3-epoxypropylthio)butane, 1,4-bis(2,3-epoxypropylthio)-2-methylbutane, 1,3-bis(2,3-epoxypropylthio)butane, 1,5-bis(2,3-epoxypropylthio)pentane, 1,5-bis(2,3-epoxypropylthio)-2-methylpentane, 1,5-bis(2,3-epoxypropylthio)-3-thiapentane, 1,6-bis(2,3-epoxypropylthio)hexane, 1,6-bis(2,3-epoxypropylthio)-2-methylhexane, 3,8-bis(2,3-epoxypropylthio)-3,6-dithiaoctane, 1,2,3-tris(2,3-epoxypropylthio)propane, 2,2-bis(2,3-epoxypropylthio)-1,3-bis(2,3-epoxypropylthiomethyl)propane, 2,2-bis(2,3-epoxypropylthiomethyl)-1-(2,3-epoxypropylthio)butane, 1,5-bis(2,3-epoxypropylthio)-2-(2,3-epoxypropylthiomethyl)-3-thiapentane, 1,5-bis(2,3-epoxypropylthio)-2,4-bis(2,3-epoxypropylthiomethyl)-3-thiapentane, 1-(2,3-epoxypropylthio)-2,2-bis(2,3-epoxypropylthiomethyl)-4-thiahexane, 1,5,6-tris(2,3-epoxypropylthio)-4-(2,3-epoxypropylthiomethyl)-3-thiahexane, 1,8-bis(2,3-epoxypropylthio)-4-(2,3-epoxypropylthiomethyl)-3,6-dithiaoctane, 1,8-bis(2,3-epoxypropylthio)-4,5-bis(2,3-epoxypropylthiomethyl)-3,6-dithiaoctane, 1,8-bis(2,3-epoxypropylthio)-4,4-bis(2,3-epoxypropylthiomethyl)-3,6-dithiaoctane, 1,8-bis(2,3-epoxypropylthio)-2,5-bis(2,3-epoxypropylthiomethyl)-3,6-dithiaoctane, 1,8-bis(2,3-epoxypropylthio)-2,4,5-tris(2,3-epoxypropylthiomethyl)-3,6-dithiaoctane, 1,1,1 tris[[2-(2,3-epoxypropylthio)ethyl]thiomethyl]-2-(2,3-epoxypropylthio) ethane, 1,1,2,2-tetrakis[[2-(2,3-epoxypropylthio)ethyl]thiomethyl]ethane, 1,11-bis(2,3-epoxypropylthio)-4,8-bis(2,3-epoxypropylthiomethyl)-3,6,9-trithiaundecane, 1,11-bis(2,3-epoxypropylthio)-4,7-bis(2,3-epoxypropylthiomethyl)-3,6,9-trithiaundecane, and 1,11-bis(2,3-epoxypropylthio)-5,7-bis(2,3-epoxypropylthiomethyl)-3,6,9-trithiaundecane; cycloaliphatic 2,3-epoxypropylthio compounds such as 1,3-bis(2,3-epoxypropylthio)cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis[[2-(2,3-epoxypropylthio)ethyl]thiomethyl]-1,4-dithiane, and 2,5-bis(2,3-epoxypropylthiomethyl)-2,5-dimethyl-1,4-dithiane; aromatic 2,3-epoxypropylthio compounds such as 1,2-bis(2,3-epoxypropylthio)benzene, 1,3-bis(2,3-epoxypropylthio)benzene, 1,4-bis(2,3-epoxypropylthio)benzene, 1,2-bis(2,3-epoxypropylthiomethyl)benzene, 1,3-bis(2,3-epoxypropylthiomethyl)benzene, 1,4-bis(2,3-epoxypropylthiomethyl)benzene, bis[4-(2,3-epoxypropylthio)phenyl]methane, 2,2-bis[4-(2,3-epoxypropylthio)phenyl]propane, bis[4-(2,3-epoxypropylthio)phenyl]sulfide, bis[4-(2,3-epoxypropylthio)phenyl]sulfone, and 4,4'-bis(2,3-epoxypropylthio)biphenyl; and the like.

Examples of oxetanyl compounds include 3-ethyl-3-hydroxymethyloxetane, 1,4-bis{[(3-ethyl-3-oxetanyl)methoxy]methyl}benzene, 3-ethyl-3-(phenoxy methyl)oxetane, di[1-ethyl-(3-oxetanyl)]methylether, 3-ethyl-3-(2-ethylhexyloxy methyl)oxetane, phenol novolac oxetane, and the like.

Examples of thietanyl compounds include 1-{4-(6-mercaptomethylthio)-1,3-dithianylthio}-3-{2-(1,3-dithietanyl)}methyl-7,9-bis(mercaptomethylthio)-2,4,6,10-tetrathiaundecane, 1,5-bis{4-(6-mercaptomethylthio)-1,3-dithianylthio}-3-{2-(1,3-dithietanyl)}methyl-2,4-dithiapentane, 4,6-bis[3-{2-(1,3-dithietanyl)}methyl-5-mercapto-2,4-dithiapentylthio]-1,3-dithiane, 3-{2-(1,3-dithietanyl)}methyl-7,9-bis(mercaptomethylthio)-1,11-dimercapto-2,4,6,10-tetrathiaundecane, 9-{2-(1,3-dithietanyl)}methyl-3,5,13,15-tetrakis(mercaptomethylthio)-1,17-dimercapto-2,6,8,10,12,16-hexathiaheptadecane, 3-{2-(1,3-dithietanyl)}methyl-7,9,13,15-tetrakis(mercaptomethylthio)-1,17-dimercapto-2,4,6,10,12,16-hexathiaheptadecane, 3,7-bis{2-(1,3-dithietanyl)}methyl-1,9-dimercapto-2,4,6,8-tetrathianonane, 4,5-bis[1-{2-(1,3-dithietanyl)}-3-mercapto-2-thiapropylthio]-1,3-dithiolane, 4-[1-{2-(1,3-dithietanyl)}-3-mercapto-2-thiapropylthio]-5-{1,2-bis(mercaptomethylthio)-4-mercapto-3-thiabutylthio}-1,3-dithiolane, 4-{4-(5-mercaptomethylthio-1,3-dithiolanyl)thio}-5-[1-{2-(1,3 dithietanyl)}-3-mercapto-2-thiapropylthio]-1,3-dithiolane, and the like.

Examples of the (meth)acryloyl compounds include diacryloyl compounds such as ethylene glycol diacrylate, 1,3-butylene glycol diacrylate, 1,4-butanediol diacrylate, 1,6-hexanediol diacrylate, cyclohexane dimethanol diacrylate, alkoxylated hexanediol diacrylate, neopentylglycol diacrylate, caprolactone modified neopentylglycol hydroxypivalate diacrylate, cyclohexane dimethanol diacrylate, diethylene glycol diacrylate, dipropylene glycol diacrylate, bisphenol A diacrylate, ethoxylated bisphenol A diacrylate, hydroxypivalaldehyde modified trimethylolpropane diacrylate, neopentylglycol diacrylate, polyethylene glycol diacrylate, propoxylated neopentylglycol diacrylate, tetraethylene glycol diacrylate, tricyclodecane dimethanol diacrylate, triethylene glycol diacrylate, and tripropylene glycol diacrylate; triacryloyl compounds such as glycerol triacrylate, ethoxylated trimethylolpropane triacrylate, pentaerythritol triacrylate, propoxylated glyceryl triacrylate, propoxylated trimethylolpropane triacrylate, and tris(2-hydroxyethyl)isocyanurate triacrylate; tetraacryloyl compounds such as ditrimethylolpropane tetraacrylate, dipentaerythritol pentaacrylate, ethoxylated pentaerythritol tetraacrylate, pentaerythritol tetraacrylate, and caprolactone-modified dipentaerythritol hexaacrylate; and the like.

Examples of the alkene compound include polyethylene, polypropylene, polyisobutylene, diethylene glycol bis(allyl carbonate), divinylbenzene, and the like.

Examples of the alkyne compound include hydrocarbon alkynes such as 2-butyne, 2-pentyne, 2-hexyne, 3-hexyne, 2-heptyne, 3-heptyne, 2-octyne, 3-octyne, 4-octyne, diisopropylacetylene, 2-nonyne, 3-nonyne, 4-nonyne, 5-nonyne, 2-decyne, 3-decyne, 4-decyne, 5-decyne, di-tert-butylacetylene, diphenylacetylene, dibenzylacetylene, methyl-iso-propylacetylene, methyl-tert-butylacetylene, ethyl-iso-propylacetylene, ethyl-tert-butylacetylene, n-propyl-iso-propylacetylene, n-propyl-tert-butylacetylene, phenylmethylacetylene, phenylethylacetylene, phenyl-n-propylacetylene, phenyl-iso-propylacetylene, phenyl-n-butylacetylene, and phenyl-tert-butylacetylene;

alkynyl alcohols such as acetylene diol, propyniol, butyneol, pentynol, hexynol, hexynediol, heptynol, heptynediol, octynol, octynediol; and alkynylamines in which a part or all of OH groups of the akynyl alcohols are substituted with $NH_2$ groups; and the like.

Examples of the bifunctional or higher active hydrogen compound include a poly(thi)ol compound having two or more hydroxyl groups or mercapto groups, a polyamine compound having two or more amino groups or secondary amino groups, a polycarbonate compound having two or more carboxyl groups, and the like. In addition, examples also include compounds which have, in one molecule, two or more active hydrogen groups selected from a hydroxyl group, a mercapto group, an amino group, a secondary amino group, a carboxyl group, and the like. Two or more active hydrogen groups may be the same as or different from each other.

Among the poly(thi)ol compounds (not including alcohols used as solvents), examples of polyol compounds include aliphatic polyols such as ethylene glycol, diethylene glycol, propylene glycol, dipropylene glycol, tripropylene glycol, butylene glycol, neopentylglycol, glycerin, trimethylolethane, trimethylolpropane, ditrimethylolpropane, butanetriol, 1,2-methylglucoside, pentaerythritol, dipentaerythritol, tripentaerythritol, sorbitol, erythritol, threitol, ribitol, arabinitol, xylitol, allitol, mannitol, dolcitol, iditol, glycol, inositol, hexanetriol, triglycerol, diglylperol, triethylene glycol, polyethylene glycol, tris(2-hydroxyethyl)isocyanurate, cyclobutanediol, cyclopentanediol, cyclohexanediol, cycloheptanediol, cyclooctanediol, cyclohexanedimethanol, hydroxypropylcyclohexanol, tricyclo[5.2.1.0$^{2,6}$]decane-dimethanol, bicyclo[4.3.0]-nonanediol, dicyclohexanediol, tricyclo[5.3.1.1]dodecanediol, bicyclo[4.3.0]nonanedimethanol, tricyclo[5.3.1.1]dodecane diethanol, hydroxypropyltricyclo[5.3.1.1]dodecanol, spiro[3.4]octanediol, butylcyclohexanediol, 1,1'-bicyclohexylidene diol, cyclohexanetriol, maltitol, and lactose; aromatic polyols such as dihydroxynaphthalene, trihydroxynaphthalene, tetrahydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xylylene glycol, di(2-hydroxyethoxy)benzene, bisphenol A-bis-(2-hydroxyethylether), tetrabromobisphenol A, and tetrabromobisphenol A-bis-(2-hydroxyethylether); halogenated polyols such as dibromoneopentylglycol; and polymer polyols such as epoxy resins. In the present embodiment, it is possible to use at least one kind selected from the above in a combination.

In addition, examples of other polyol compounds include condensation reaction products of organic acids such as oxalic acid, glutamic acid, adipic acid, acetic acid, propionic acid, cyclohexane carboxylic acid, β-oxocyclohexane propionic acid, dimer acid, phthalic acid, isophthalic acid, salicylic acid, 3-bromopropionic acid, 2-bromoglycol, dicarboxycyclohexane, pyromellitic acid, butanetetracarboxylic acid, and bromophthalic acid and the above polyols; addition reaction products of the polyols above and alkylene oxides such as ethylene oxide or propylene oxide; addition reaction products of an alkylene polyamine and an alkylene oxide such as ethylene oxide or propylene oxide; furthermore, bis-[4-(hydroxyethoxy)phenyl]sulfide, bis-[4-(2-hydroxypropoxy)phenyl]sulfide, bis-[4-(2,3-dihydroxypropoxy)phenyl]sulfide, bis-[4-(4-hydroxycyclohexyloxy)phenyl]sulfide, bis-[2-methyl-4-(hydroxyethoxy)-6-butylphenyl]sulfide and compounds in which ethylene oxide and/or propylene oxide having an average of 3 molecules or less per hydroxyl group are added to these compounds; polyols containing sulfur atoms such as di-(2-hydroxyethyl)sulfide, 1,2-bis-(2-hydroxyethylmercapto) ethane, bis(2-hydroxyethyl)disulfide, 1,4-dithiane-2,5-diol, bis(2,3-dihydroxypropyl)sulfide, tetrakis(4-hydroxy-2-thiabutyl)methane, bis(4-hydroxyphenyl)sulfone (bisphenol S), tetrabromobisphenol S, tetramethyl bisphenol S, 4,4'-thiobis(6-tert-butyl-3-methylphenol), 1,3-bis(2-hydroxyethylthioethyl)-cyclohexane; and the like. In the present embodiment, it is possible to use at least one kind selected from the above in a combination.

Examples of polythiol compounds include aliphatic polythiol compounds such as methanedithiol, 1,2-ethanedithiol, 1,2,3-propanetrithiol, 1,2-cyclohexanedithiol, bis(2-mercaptoethyl)ether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane and esters of these thioglycolic acids and mercaptopropionic acids, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropinate), hydroxyethyl disulfide bis(2-mercaptoacetate), hydroxyethyl disulfide bis(3-mercaptopropionate), 2-mercaptoethylether bis(2-mercaptoacetate), 2-mercaptoethylether bis(3-mercaptopropionate), thiodiglycolic acid bis(2-mercaptoethylester), thiodipropionic acid bis(2-mercaptoethylester), dithiodiglycolic acid bis(2-mercaptoethylester), dithiodipropionic acid bis(2-mercaptoethylester), 1,1,3,3-tetrakis(mercaptomethylthio)propane, 1,1,2,2-tetrakis(mercaptomethylthio)ethane, 4,6-bis(mercaptomethylthio)-1,3-dithiane, tris(mercaptomethylthio)methane, and tris(mercaptoethylthio)methane; aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, and 2,6-naphthalenedithiol; heterocyclic polythiol compounds such as 2-methylamino-4,6-dithiol-sym-triazine, 3,4-thiophenedithiol, bismuthiol, 4,6-bis(mercaptomethylthio)-1,3-dithiane, 2-(2,2-bis(mercaptomethylthio)ethyl)-1,3-dithietane; and the like.

Examples of polyamine compounds include primary polyamine compounds such as ethylenediamine, 1,2- or 1,3-diaminopropane, 1,2-, 1,3-, or 1,4-diaminobutane, 1,5-diaminopentane, 1,6-diaminohexane, 1,7-diaminoheptane, 1,8-diaminooctane, 1,10-diaminodecane, 1,2-, 1,3-, or 1,4-diaminocyclohexane, o-, m- or p-diaminobenzene, 3,4- or 4,4'-diaminobenzophenone, 3,4- or 4,4'-diaminodiphenylether, 4,4'-diaminodiphenylmethane, 4,4'-diaminodiphenylsulfide, 3,3'- or 4,4'-diaminodiphenylsulfone, 2,7-diaminofluorene, 1,5-, 1,8-, or 2,3-diaminonaphthalene, 2,3-, 2,6-, or 3,4-diaminopyridine, 2,4- or 2,6-diaminotoluene, m- or p-xylylenediamine, isophoronediamine, diaminomethylbicycloheptane, 1,3- or 1,4-diaminomethylcyclohexane, 2- or 4-aminopiperidine, 2- or 4-aminomethylpiperidine, 2- or 4-aminoethylpiperidine, N-aminoethylmorpholine, and N-aminopropylmorpholine; monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, and morpholine; secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diamino hexane, N,N'-dimethyl-1,7-diaminoheptane, N,N'-diethylethylenediamine, N,N'-diethyl-1,2-diaminopropane, N,N'-diethyl-1,3-diamino propane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, and tetramethylguanidine; and the like.

Examples of polycarboxylic acid compounds include succinic acid, adipic acid, sebacic acid, azelaic acid, dodecanedioic acid, terephthalic acid, isophthalic acid, orthophthalic acid, phthalic anhydride, tetrahydrophthalic acid, hexahydrophthalic acid, naphthalenedicarboxylic acid, biphenyldicarboxylic acid, dimer acid, trimellitic acid, pyromellitic acid, ε-caprolactone, and the like.

Examples of the acid anhydride include succinic anhydride, phthalic anhydride, maleic anhydride, tetrabromophthalic anhydride, tetrahydrophthalic anhydride, trimellitic anhydride, dodecylsuccinic anhydride, and the like.

These polymerization reactive compounds may be used alone or in a mixture of two or more kinds.

More detailed description will be given of the polymerization reactive compound included in the composition of the present embodiment. It is possible to classify the polymerization reactive compounds described above into (Group A) and (Group B) depending on reactivity.

(Group A): It is possible to classify a polyiso(thio)cyanate compound, a (thio)epoxy compound, an oxetanyl compound, a thietanyl compound, a (meth)acryloyl compound, an alkene compound, or an alkyne compound into (Group A) as a self-polymerizable or copolymerizable compound. However, the following (Group B) is not included in (Group A).

(Group B): It is possible to classify a bifunctional or higher active hydrogen compound which is a poly(thi)ol compound, a polyamine compound, or a polycarboxylic acid compound, or an acid anhydride into (Group B) as an addition polymerizable compound. However, (Group A) is not included in (Group B) and the polyol compound does not include (poly)alkylene glycol used as a modifier.

In a case where the polymerization reactive compound described above is used alone, any one kind selected from (Group A) or (Group B) is selected. In a case where the polymerization reactive compound described above is used alone (one kind), one kind selected from the self-polymerizable or copolymerizable compound (Group A) is preferable because this kind is more easily cured than one kind selected from the addition polymerizable compounds (Group B).

In a case where two or more kinds of the polymerization reactive compounds described above are used, examples include a method for mixing two or more kinds selected only from (Group A), two or more kinds selected only from (Group B), or one or more kinds selected from (Group A) and one or more kinds selected from (Group B).

In the present embodiment, as the polymerization reactive compound, it is possible to use a polyiso(thio)cyanate compound of (Group A) and a bifunctional or higher active hydrogen compound of (Group B).

Polyiso(thio)cyanate compounds classified as a self-polymerizable or copolymerizable compound tend to be lower in self-polymerizable or copolymerization reactivity with the (Group A) compounds than the other compounds classified in (Group A); however, when the conditions are selected, it may be possible to obtain a self-polymerization reaction type polymer such as a 1-nylon-based polymer and an isocyanurate-based polymer. Furthermore, in the copolymerization with a (thio)epoxy compound, an ethylene carbonate-based copolymer polymer may be obtained.

Although polymerization is generally difficult with two or more kinds selected only from the addition polymerizable (Group B), in a case where an acid anhydride and a poly(thi)ol compound are combined, a case where an acid anhydride and a polyamine compound are combined, or a case where three kinds of an acid anhydride, a poly(thi)ol compound and a polyamine compound are combined, there is a tendency for the polymerization reaction to proceed easily and to obtain a cured resin. The blending ratio of acid anhydride and poly(thi)ol or polyamine is in a range of approximately 8/2 to 2/8, preferably in the range of 6/4 to 4/6, and more preferably in the range of 55/45 to 45/55 in the functional group molar ratio of the acid anhydride group of the acid anhydride/the mercapto group of the poly(thi)ol (or amino group of polyamine).

When the blending ratio in a case of using both (Group A) and (Group B) is represented by the functional group molar ratio of the polymerizable functional group of (Group A)/polymerizable functional group of (Group B), the blending ratio is approximately in the range of 999/1 to 1/9, preferably in the range of 99/1 to 10/90, more preferably in the range of 9/1 to 3/7, and most preferably in the range of 7/3 to 4/6.

The polymerizable composition of the present embodiment may contain components other than the polymerization reactive compound described above. For example, from the viewpoint of the effect of the present embodiment, it is possible to include a modifier such as a polyether-modified compound, an ester compound, or an ether compound. Description will be given below.

[Polyether-Modified Compound, Ester Compound, Ether Compound]

(Polyether-Modified Compound)

In the present embodiment, as the polyether-modified compound, a polyether-modified compound having a polyether group represented by General Formula (4a) is used.

In General Formula (4a), $R_{25}$ represents a linear or branched alkylene group having 1 to 20 carbon atoms, $R_{26}$ represents a hydrogen atom, a linear or branched alkyl group having 1 to 20 carbon atoms, a linear or branched alkenyl group having 2 to 20 carbon atoms, or a linear or branched alkynyl group having 2 to 20 carbon atoms. A plurality of present $R_{25}$'s may be the same as or different from each other. k represents an integer of 1 or more.

Here, it is possible to appropriately select k indicating the polymerization number of the polyether moiety from an integer of 1 or more, preferably an integer of 1 to 20, and more preferably an integer of 1 to 10.

In addition, in one embodiment, from the viewpoint of improving the balance between the effect of suppressing the striae of the obtained molded product and the effect of improving the transparency of the molded product while extending the pot life of the polymerizable composition, k is preferably an integer of 1 to 1,000, more preferably an integer of 40 to 600, and even more preferably an integer of 55 to 550.

In addition, in one embodiment, $R_{26}$ of the polyether group represented by General Formula (4a) preferably represents a hydrogen atom or a linear or branched alkyl group having 1 to 20 carbon atoms.

In addition, in one embodiment, $R_{26}$ of the polyether group represented by General Formula (4a) represents a linear or branched alkenyl group having 2 to 20 carbon atoms or a linear or branched alkynyl group having 2 to 20 carbon atoms.

In addition, in one embodiment, from the viewpoint of improving the balance between the effect of suppressing the striae of the obtained molded product and the effect of improving the transparency of the molded product while extending the pot life of the polymerizable composition, $R_{26}$ of the polyether group represented by General Formula (4a) is preferably a hydrogen atom or a linear or branched alkenyl group having 2 to 20 carbon atoms, and more preferably a hydrogen atom or a linear or branched alkenyl group having 2 to 8 carbon atoms.

More specifically, in the present embodiment, as the polyether-modified compound, it is possible to use at least one kind of compounds selected from the compounds represented by General Formulas (1a) to (3a).

Using these compounds makes possible to more effectively suppress striae occurring in the cavity during polymerization and striae at the time of casting due to thickening after finishing preparation.

(Compound Represented by General Formula (1a))

In the present embodiment, it is possible to use the polyether-modified siloxane compound represented by General Formula (1a) as the polyether-modified compound.

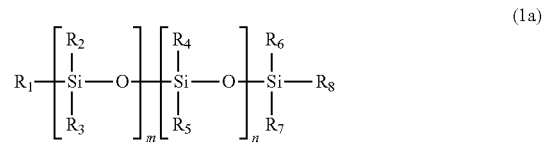

$R_1$ to $R_8$ may be the same as or different from each other, and at least one of $R_1$ to $R_8$ represents a polyether group represented by General Formula (4a), and the other $R_1$ to $R_8$ may be the same as or different from each other and represent a linear or branched alkyl group having 1 to 20 carbon atoms, a linear or branched alkoxy group having 1 to 20 carbon atoms, a hydroxyl group, or a polysiloxy group. A plurality of present $R_2$ to $R_5$ may be the same as or different from each other. m and n, which may be the same as or different from each other, are an integer of 0 or more, preferably an integer of 1 to 20, and more preferably an integer of 1 to 10.

(Compound Represented by General Formula (2a))

In the present embodiment, it is possible to use the polyether-modified fluoro compound represented by General Formula (2a) as the polyether-modified compound.

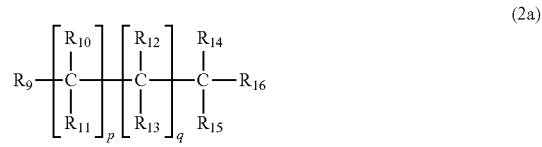

$R_9$ to $R_{16}$ may be the same as or different from each other and at least one of $R_9$ to $R_{16}$ is a polyether group represented by General Formula (4a) and at least one is a fluorine atom or a linear or branched perfluoroalkyl group having 1 to 20 carbon atoms. The other $R_9$ to $R_{16}$ each represents a linear or branched alkyl group having 1 to 20 carbon atoms. A plurality of present $R_{10}$ to $R_{13}$ may be the same as or different from each other.

p and q may be the same as or different from each other and are an integer of 0 or more, preferably an integer of 1 to 20, and more preferably an integer of 1 to 10.

(Compound Represented by General Formula (3a))

In the present embodiment, it is possible to use a polyether-modified (meth)acrylic compound represented by General Formula (3a) as the polyether-modified compound.

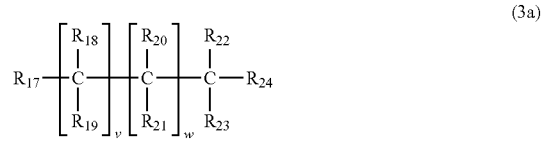

$R_{17}$ to $R_{24}$ may be the same as or different from each other, and at least one of $R_{17}$ to $R_{24}$ is a polyether group represented by General Formula (4a), and at least one is a (meth)acryloyl group or a linear or branched alkyl group having 1 to 20 carbon atoms having a (meth)acryloyl group. The other $R_{17}$ to $R_{24}$ each represents a linear or branched alkyl group having 1 to 20 carbon atoms. A plurality of present $R_{18}$ to $R_{21}$ may be the same as or different from each other.

v and w may be the same as or different from each other and are an integer of 0 or more, preferably an integer of 1 to 20, and more preferably an integer of 1 to 10.

Here, specific examples of the substituents in General Formulas (1a) to (4a) include those shown below.

Examples of a linear or branched alkylene group having 1 to 20 carbon atoms include a methylene group, an ethylene group, an n-propylene group, an isopropylene group, an n-butylene group, an isobutylene group, a t-butylene group, an n-pentylene group, an isopentylene group, a t-pentylene group, an n-hexylene group, an n-heptylene group, an isoheptylene group, an n-octylene group, an isooctylene group, an n-nonylene group, an isononylene group, an n-decylene group, an isodecylene group, an n-undecylene group, an isoundecylene group, an n-dodecylene group, an isododecylene group, a cyclopentylene group, a cyclohexylene group, a cycloheptylene group, a cyclooctylene group, a cyclononylene group, a methylcyclopentylene group, a methylcyclohexylene group, and the like. Preferable examples include a linear or branched alkylene group having 1 to 8 carbon atoms.

Examples of the linear or branched alkyl group having 1 to 20 carbon atoms include a methyl group, an ethyl group, an n-propyl group, an isopropyl group, an n-butyl group, an isobutyl group, a t-butyl group, an n-pentyl group, an isopentyl group, a t-pentyl group, an n-hexyl group, an n-heptyl group, an isoheptyl group, an n-octyl group, an isooctyl group, an n-nonyl group, an isononyl group, an n-decyl group, an isodecyl group, an n-undecyl group, an isoundecyl group, an n-dodecyl group, an isododecyl group, a cyclopentyl group, a cyclohexyl group, a cycloheptyl group, a cyclooctyl group, a cyclononyl group, a methylcyclopentyl group, a methylcyclohexyl group, and the like.

Preferable examples include a linear or branched alkyl group having 1 to 8 carbon atoms.

Examples of the linear or branched alkoxy group having 1 to 20 carbon atoms include a methoxy group, an ethoxy group, an n-propyloxy group, an isopropyloxy group, an n-butyloxy group, an isobutyloxy group, a t-butyloxy group, an n-pentyloxy group, an isopentyl group, a t-pentyloxy group, an n-hexyloxy group, an n-heptyloxy group, an isoheptyloxy group, an n-octyloxy group, an isooctyloxy group, an n-nonyloxy group, an isononyloxy group, an n-decyloxy group, an isodecyloxy group, an n-undecyloxy group, an isoundecyloxy group, an n-dodecyloxy group, an isododecyloxy group, a cyclopentyloxy group, a cyclohexyloxy group, a cycloheptyloxy group, a cyclooctyloxy group, a cyclononyloxy group, a methylcyclopentlyoxy group, a methylcyclohexyloxy group, and the like.

Preferable examples include a linear or branched alkoxy group having 1 to 8 carbon atoms.

Examples of the linear or branched alkenyl group having 2 to 20 carbon atoms include a vinyl group, a 1-propenyl group, a 2-propenyl group, a 1-butenyl group, a 2-butenyl group, a 3-butenyl group, a 1-pentenyl group, a 2-pentenyl group, a 3-pentenyl group, a 4-pentenyl group, a 1-hexenyl group, a 2-hexenyl group, a 3-hexenyl group, a 4-hexenyl group, a 5-hexenyl group, a 6-heptenyl group, a 7-octenyl group, an 8-nonenyl group, a 9-decenyl group, a 2-methyl-1-propenyl group, a 2-methyl-2-propenyl group, a 3-methyl-3-butenyl group, a 4-methyl-4-pentenyl group, a 2-cyclohexyl-2-propenyl group, and the like.

Preferable examples include a linear or branched alkenyl group having 2 to 8 carbon atoms.

Examples of the linear or branched alkynyl group having 2 to 20 carbon atoms include an ethynyl group, a 1-propynyl group, a 2-propynyl group, a 1-butynyl group, a 2-butynyl group, a 3-butynyl group, a 2-methyl-2-propynyl group, a 3-methyl-1-butynyl group, a 4-pentynyl group, a 5-hexynyl group, a 6-heptynyl group, a 7-octynyl group, an 8-nonynyl group, a 9-decynyl group, and the like.

Preferable examples include a linear or branched alkynyl group having 2 to 8 carbon atoms.

Examples of the linear or branched perfluoroalkyl group having 1 to 20 carbon atoms include a perfluoromethyl group, a perfluoroethyl group, a perfluoro-n-propyl group, a perfluoroisopropyl group, a perfluoro-n-butyl group, a perfluoroisobutyl group, a perfluoro-t-butyl group, a perfluoro-n-pentyl group, a perfluoroisopentyl group, a perfluoro-t-pentyl group, a perfluoro-n-hexyl group, a perfluorocyclohexyl group, a perfluoro-n-heptyl group, a perfluoroisoheptyl group, a perfluoro-n-octyl group, a perfluoroisooctyl group, a perfluoro-n-nonyl group, a perfluoroisononyl group, a perfluoro-n-decyl group, a perfluoroisodecyl group, a perfluoro-n-undecyl group, a perfluoroisoundecyl group, a perfluoro-n-dodecyl group, a perfluoro isododecyl group, a perfluorocyclopentyl group, a perfluorocyclohexyl group, a perfluorocycloheptyl group, a perfluorocyclooctyl group, a perfluorocyclononyl group, a perfluoromethylcyclopentyl group, a perfluoromethylcyclohexyl group, and the like.

Preferable examples include a linear or branched perfluoroalkyl group having 1 to 8 carbon atoms.

Examples of the compound represented by General Formula (1a) include Polyflow KL-100, Polyflow KL-600, Granol 410 (trade name, manufactured by Kyoeisha Chemical Co., Ltd.); BYK-302, BYK-307, BYK-322, BYK-323, BYK-331, BYK-333, BYK-347, BYK-348, BYK-349 (trade name, manufactured by BYK-Chemie); KF-351, KF-352, KF-353, KF-354L, KF-355, KF-355A, KF-615A, KF-618, (trade name, manufactured by Shin-Etsu Chemical Co., Ltd.); SH3746, SH3771, SH8400, SF8410 (trade name, manufactured by Dow Corning Toray Co., Ltd.); TSF4440, TSF4445, TSF4446, and TSF4452 (trade name, manufactured by Toshiba Silicone Co., Ltd.); and the like, but the compounds are not limited to these exemplified compounds. These may be used singly or as a mixture of two or more kinds.

Particularly preferable examples are Polyflow KL-100 and Polyflow KL-600 (trade name, manufactured by Kyoeisha Chemical Co., Ltd.).

In addition, from the viewpoint of improving the balance between the effect of suppressing the striae of the obtained molded product and the effect of improving the transparency of the molded product while extending the pot life of the polymerizable composition, the compound represented by General Formula (1a) is preferably one kind or more selected from Polyflow KL-100 and Polyflow KL-600 (trade name, manufactured by Kyoeisha Chemical Co., Ltd.), and more preferably Polyflow KL-100.

Examples of the compound represented by General Formula (2a) include Ftergent 251, 212M, 215M, 250, 209F, 222F, 245F, 208G, 218GL, 240G, 212P, 220P, 228P, FTX-218, DFX-18 (trade names, manufactured by Neos Co., Ltd.), and the like, but the compound is not limited only to these exemplified compounds. These may be used singly or as a mixture of two or more kinds.

Examples of the compound represented by General Formula (3a) include BYK 350, 354, 355, 356, 358N, 360P, 361N, 364P, 366P, 368P, 370, 377, 378, 381, 390, 392, 394, 399 (trade name, manufactured by BYK Chemie Japan), and the like, but the compound is not limited to these exemplified compounds. These may be used singly or as a mixture of two or more kinds.

In the present embodiment, from the viewpoint of the effect of the present invention, as the polyether-modified compound, it is possible to preferably use a polyether-modified siloxane compound represented by General Formula (1a).

From the viewpoint of improving the balance between the effect of suppressing the striae of the obtained molded product and the effect of improving the transparency of the molded product while extending the pot life of the polymerizable composition, the polyether-modified compound preferably includes a compound represented by General the molded product, a+c in General Formula (6a) is preferably 1 to 100, and more preferably 5 to 50.

From the same viewpoint, b in General Formula (6a) is preferably 1 to 100, and more preferably 5 to 50.

From the same viewpoint, d in General Formula (6a) is preferably 10 to 1,000, and more preferably 50 to 500.

From the same viewpoint, e in General Formula (6a) is preferably 1 to 100, and more preferably 5 to 50.

In addition, from the same viewpoint, the molecular weight of the compound represented by General Formula (6a) is preferably 100 to 10,000, and more preferably 1,000 to 5,000.

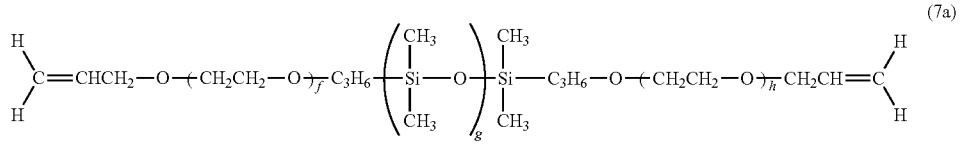

(7a)

Formula (1a); more preferably includes at least one kind selected from a group formed of a compound represented by General Formula (1a), in which $R_{26}$ of the polyether group represented by General Formula (4a) is a hydrogen atom and a compound represented by General Formula (1a) in which $R_{26}$ of the polyether group represented by General Formula (4a) is a linear or branched alkenyl group having 2 to 20 carbon atoms; even more preferably includes at least one kind selected from a group formed of a compound represented by General Formula (1a), in which $R_{26}$ of the polyether group represented by General Formula (4a) is a hydrogen atom and a compound represented by General Formula (1a) in which $R_{26}$ of the polyether group represented by General Formula (4a) is a linear or branched alkenyl group having 2 to 8 carbon atoms; yet more preferably includes at least one kind selected from a group formed of a compound represented by General Formula (1a) in which $R_{26}$ of a polyether group represented by General Formula (4a) is a hydrogen atom, and a compound represented by General Formula (1a), in which $R_{26}$ of the polyether group represented by General Formula (4a) is a linear or branched alkenyl group having 2 to 8 carbon atoms; and still more preferably includes a compound represented by General Formula (6a) and a compound represented by General Formula (7a).

From the viewpoint of improving the balance of the effect of extending the pot life of the polymerizable composition, the effect of improving the transparency of the obtained molded product, and the effect of suppressing the striae in the molded product, f+h in General Formula (7a) is preferably 1 to 100, and more preferably 1 to 20.

From the same viewpoint, g in General Formula (7a) is preferably 1 to 100, and more preferably 1 to 10.

In addition, from the same viewpoint, the molecular weight of the compound represented by General Formula (7a) is preferably 100 to 10,000, and more preferably 500 to 5,000.

In addition, when the polyether-modified compound includes the compounds represented by General Formulas (6a) and (7a), regarding the mass ratio of the compound represented by General Formula (6a) and the compound represented by General Formula (7a) in the polyether-modified compound, the mass ratio of the compound represented by General Formula (6a) with respect to the total mass of the compound represented by General Formula (6a) and the compound represented by General Formula (7a) is preferably 50% to 90%, and more preferably 60% to 80% from the viewpoint of improving the balance of the effect of extending the pot life of the polymerizable composition, the

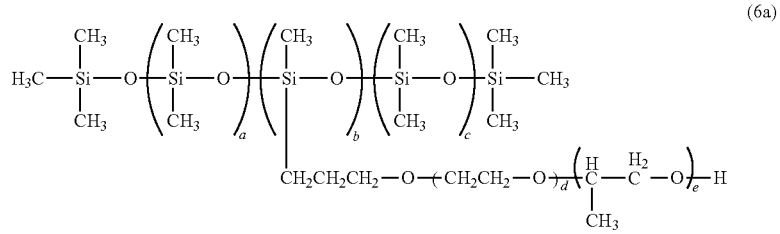

(6a)

From the viewpoint of improving the balance of the effect of extending the pot life of the polymerizable composition, the effect of improving the transparency of the obtained molded product, and the effect of suppressing the striae in effect of improving the transparency of the obtained molded product, and the effect of suppressing the striae in the molded product.

The content of the polyether-modified compound in the polymerizable composition (100% by weight) of the present embodiment is appropriately selected according to the kind and combination of the polymerizable composition, the kind of additives such as the polymerization catalyst and the internal mold release agent, the usage amount, various physical properties of the resin obtained by polymerizing the polymerizable composition, and the shape of the molded product, and is 0.01% by weight or more, and preferably 0.01% by weight to 7.5% by weight, without being limited thereto.

For example, in a case where a thiourethane resin is prepared by thermosetting a polymerizable composition which includes a polyisocyanate compound and a polythiol compound as a polymerization reactive compound, the content of the polyether-modified compound in the polymerizable composition is 0.01% by weight or more, preferably 0.01% by weight to 7.5% by weight, more preferably 0.10% by weight to 5.0% by weight, and even more preferably 0.5% by weight to 2.5% by weight.

(Ester Compound)

The ester compound is a compound represented by General Formula (1b).

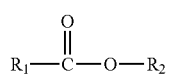
(1b)

In General Formula (1b), $R_1$ represents a hydrogen atom, a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms and having one or more unsaturated bonds, and $R_2$ represents a polyoxyalkylene group represented by General Formula (2b).

$$—(CH_2CHR_3O)_n H \quad (2b)$$

In General Formula (2b), a plurality of present $R_3$'s may be the same as or different from each other and each represents a hydrogen atom or a methyl group, and n represents an integer of 2 to 20.

In General Formula (1b), the number of carbon atoms of $R_1$ is preferably 8 to 20, more preferably 10 to 20, and even more preferably 12 to 18.

Specifically, the linear alkyl group having 1 to 20 carbon atoms in $R_1$ of General Formula (1b) is a group represented by General Formula (6b).

$$H—(CH_2)_x— \quad (6b)$$

In General Formula (6b), x represents an integer of 1 to 20.

In addition, examples of the linear alkyl group having 1 to 20 carbon atoms or the branched alkyl group having 3 to 20 carbon atoms of $R_1$ include a methyl group, an ethyl group, an n-propyl group, an isopropyl group, an n-butyl group, an isobutyl group, a t-butyl group, n-pentyl group, an isopentyl group, a t-pentyl group, an n-hexyl group, an n-heptyl group, an isoheptyl group, an n-octyl group, an isooctyl group, an n-nonyl group, an isononyl group, an n-decyl group, an isodecyl group, an n-undecyl group, an isoundecyl group, an n-dodecyl group, an isododecyl group, a tridecyl group, a tetradecyl group, a pentadecyl group, a hexadecyl group, a heptadecyl group, an octadecyl group, a nonadecyl group, an icosyl group, a cyclopentyl group, a cyclohexyl group, a cycloheptyl group, a cyclooctyl group, a cyclononyl group, a methylcyclopentyl group, a methylcyclohexyl group, and the like.

From the viewpoint of suppressing the striae of the obtained molded product, in $R_1$ of General Formula (1b), the linear hydrocarbon group having 2 to 20 carbon atoms and having one or more unsaturated bonds is preferably a linear hydrocarbon group having 2 to 20 carbon atoms and having one or two unsaturated bonds, more preferably a linear hydrocarbon group having 3 to 20 carbon atoms represented by General Formula (7b), or a linear hydrocarbon group having 5 to 20 carbon atoms represented by General Formula (8b).

$$H_3C—(CH_2)_y CH=CH—(CH_2)_x— \quad (7b)$$

In General Formula (7b), x and y each independently represent an integer of 0 to 17, and x+y is an integer of 0 to 17.

$$H_3C—(CH_2)_z CH=CH—(CH_2)_y CH=CH—(CH_2)_x— \quad (8b)$$

In General Formula (8b), x, y, and z each independently represent an integer of 0 to 15, and x+y+z is an integer of 0 to 15.

Examples of the linear hydrocarbon group or the branched hydrocarbon group having one or more unsaturated bonds, the linear hydrocarbon group having 2 to 20 carbon atoms and the branched hydrocarbon group having 3 to 20 carbon atoms, in $R_1$ of General Formula (1b) include an ethenyl group, a propenyl group, an isopropenyl group, a butenyl group, an isobutenyl group, a pentenyl group, an isopentenyl group, a t-pentenyl group, a hexenyl group, a heptenyl group, an isoheptenyl group, an octenyl group, an isooctenyl group, a nonenyl group, an isononenyl group, a decenyl group, an isodecenyl group, an undecenyl group, an isoundecenyl group, a dodecenyl group, an isododecenyl group, a tridecenyl group, a tetradecenyl group, a pentadecenyl group, a hexadecenyl group, a heptadecenyl group, an octadecenyl group, a nonadecenyl group, an icosenyl group, and the like.

From the viewpoint of improving the balance between the effect of suppressing the striae of the obtained molded product and the effect of improving the transparency of the molded product while extending the pot life of the polymerizable composition, $R_1$ of General Formula (1b) is preferably a linear alkyl group having 1 to 20 carbon atoms, a linear hydrocarbon group having 2 to 20 carbon atoms and having one or more unsaturated bonds, a branched alkyl group having 3 to 20 carbon atoms, or a branched hydrocarbon group having 3 to 20 carbon atoms and having one or more unsaturated bonds. That is, the ester compound of General Formula (1b) is preferably a polyoxyalkylene fatty acid ester.

In $R_2$ in General Formula (1b), a plurality of present $R_3$'s in General Formula (2b) may be the same as or different from each other and represent a hydrogen atom or a methyl group, and preferably a hydrogen atom from the viewpoint of suppressing the striae of the obtained molded product.

In addition, in $R_2$ in General Formula (1b), n in General Formula (2b) is an integer of 2 to 20, and preferably 2 to 18 from the viewpoint of suppressing the striae of the obtained molded product.

When the polymerizable composition includes the ester compound represented by General Formula (1b), from the viewpoint of improving the balance between the effect of suppressing the striae of the obtained molded product and the effect of improving the transparency of the molded product while extending the pot life of the polymerizable composition, it is preferable to use two or more kinds of compounds in combination, and it is preferable to include a compound in which $R_1$ is an alkyl group and a compound in which $R_1$ is a hydrocarbon group having an unsaturated bond as the ester compound, and it is more preferable to include a compound in which $R_1$ is a linear alkyl group, a compound in which $R_1$ is a hydrocarbon group having one unsaturated bond, and a compound in which $R_1$ is a hydrocarbon group having two unsaturated bonds as the ester compound.

In addition, the polymerizable composition may include a plurality of compounds in which $R_1$ or $R_2$ are different as the ester compound, more specifically, a plurality of compounds in which $R_1$ or n are different may be included as the ester compound.

When the polymerizable composition includes an ester compound, the content of the ester compound in the polymerizable composition is preferably 0.01 to 7.5% by weight, more preferably 0.01 to 4% by weight, even more preferably 0.03 to 2.5% by weight, even more preferably 0.05 to 1% by weight, and yet more preferably 0.1 to 0.5% by weight with respect to 100% by weight of the polymerizable composition.

(Ether Compound)

The ether compound is a compound represented by General Formula (3b).

$$R_4\text{—}O\text{—}R_5 \quad (3b)$$

In General Formula (3b), $R_4$ represents a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms and having one or more unsaturated bonds. $R_5$ is a linear alkyl group having 1 to 20 carbon atoms, a branched alkyl group having 3 to 20 carbon atoms, or a (poly)oxyalkylene group represented by General Formula (4b).

$$\text{—}(CH_2CHR_6O)_mH \quad (4b)$$

In General Formula (4b), a plurality of present $R_6$'s may be the same as or different from each other, each represents a hydrogen atom or a methyl group, and m represents an integer of 1 to 20.

In General Formula (3b), the number of carbon atoms of $R_4$ is preferably 10 to 20, more preferably 12 to 20, and even more preferably 15 to 19, from the viewpoint of suppressing the striae of the obtained molded product.

Specific examples of the linear alkyl group having 1 to 20 carbon atoms or the branched alkyl group having 3 to 20 carbon atoms in $R_4$ in General Formula (3b) include the groups described above as $R_1$ in General Formula (1b). In addition, in General Formula (3b), the linear alkyl group having 1 to 20 carbon atoms in R4 is specifically a group represented by General Formula (6b) for $R_1$ in General Formula (1b).

Specific examples of the linear hydrocarbon group having 2 to 20 carbon atoms or the branched hydrocarbon group having 3 to 20 carbon atoms and having one or more unsaturated bonds in $R_4$ in General Formula (3b) include the groups described above as $R_1$ in General Formula (1b). In addition, specific examples of the linear hydrocarbon group having 2 to 20 carbon atoms and having one or more unsaturated bonds in $R_4$ in General Formula (3b) include the group represented by General Formula (7b) or (8b) for $R_1$ in General Formula (1b).

From the viewpoint of suppressing the striae of the obtained molded product, in $R_4$ of General Formula (3b), the linear hydrocarbon group having 2 to 20 carbon atoms and having one or more unsaturated bonds is preferably a linear hydrocarbon group having 2 to 20 carbon atoms and having one or two unsaturated bonds, more preferably a linear hydrocarbon group having 3 to 20 carbon atoms represented by General Formula (7b) in $R_1$ in General Formula (1b), or a linear hydrocarbon group having 5 to 20 carbon atoms represented by General Formula (8b) for $R_1$ in General Formula (1b), and even more preferably a linear hydrocarbon group having 3 to 20 carbon atoms represented by General Formula (7b) for $R_1$ in General Formula (1b).

In $R_5$ in General Formula (3b), a plurality of present $R_6$'s in General Formula (4b) may be the same as or different from each other and each represents a hydrogen atom or a methyl group, and preferably a hydrogen atom from the viewpoint of suppressing the striae of the obtained molded product.

In addition, in $R_5$ in General Formula (3b), m in General Formula (4b) is an integer of 1 to 20, and preferably 1 to 18 from the viewpoint of suppressing the striae of the obtained molded product.

The ether compound is preferably a compound having a (poly)oxyalkylene group, and more preferably a compound having a polyoxyalkylene group, from the viewpoint of suppressing the striae of the obtained molded product.

When the polymerizable composition includes the ether compound represented by General Formula (3b), from the viewpoint of improving the balance between the effect of suppressing the striae of the obtained molded product and the effect of improving the transparency of the molded product while extending the pot life of the polymerizable composition, it is preferable to use two or more kinds of compounds in combination, it is preferable to include a compound in which $R_4$ is an alkyl group and a compound in which $R_4$ is a hydrocarbon group having an unsaturated bond as the ether compound, and it is more preferable to include a compound in which $R_4$ is a linear alkyl group and a compound in which $R_4$ is a hydrocarbon group having one unsaturated bond as the ether compound.

In addition, the polymerizable composition may include a plurality of compounds in which $R_4$ or $R_5$ are different as an ether compound and, more specifically, may include a plurality of compounds in which $R_4$ or m are different as the ether compound.

When the polymerizable composition includes an ether compound, the content of the ether compound in the polymerizable composition is preferably 0.01 to 7.5% by weight, more preferably 0.01 to 1% by weight, even more preferably 0.03 to 0.5% by weight, even more preferably 0.05 to 0.3% by weight, and yet more preferably 0.05 to 0.2% by weight with respect to 100% by weight of the polymerizable composition.

The polymerizable composition may include either an ester compound or an ether compound, or may include both. From the viewpoint of improving the balance between the effect of suppressing the striae of the obtained molded product and the effect of improving the transparency of the molded product while extending the pot life of the polymerizable composition, it is preferable that the polymerizable composition includes an ester compound and an ether compound.

When the polymerizable composition includes an ester compound and an ether compound, $R_1$ in General Formula (1b) and $R_4$ in General Formula (3b) may be the same group or different groups, and $R_2$ in General Formula (1b) and $R_5$ in General Formula (3b) may be the same group or different groups.

The total weight of the ester compound and the ether compound in the polymerizable composition is preferably 0.01 to 7.5% by weight, more preferably 0.02 to 5% by weight, more preferably 0.06 to 3% by weight, and even more preferably 0.1 to 1.3% by weight with respect to 100% by weight of the polymerizable composition.

In addition, the polymerizable composition of the present embodiment may further include a modifier other than the polyether-modified compound, the ester compound, and the ether compound.

For example, the polymerizable composition may further include a compound having a structure represented by General Formula (1b) in which $R_2$ is represented by General Formula (2b) and n=1.

In addition, the polymerizable composition may further include a compound having a structure represented by General Formula (1b), in which $R_2$ is a linear alkyl group having 1 to 20 carbon atoms or a branched alkyl group having 3 to 20 carbon atoms.

In addition, the polymerizable composition may further include (poly)alkylene glycol represented by General Formula (5b) as a modifier.

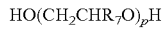

$$HO(CH_2CHR_7O)_pH \quad (5b)$$

In General Formula (5), a plurality of present $R_7$'s may be the same as or different from each other and each represents a hydrogen atom or a methyl group, and p represents an integer of 1 to 20.

In General Formula (5b), a plurality of present $R_7$'s may be the same as or different from each other and each represents a hydrogen atom or a methyl group and preferably a hydrogen atom from the viewpoint of suppressing the striae of the obtained molded product.

In addition, in General Formula (5b), p is an integer of 1 to 20 and preferably an integer of 2 to 20 from the viewpoint of suppressing the striae of the obtained molded product. The polymerizable composition may include a plurality of compounds in which p is different as (poly)alkylene glycol.

From the viewpoint of suppressing the striae of the obtained molded product, the (poly) alkylene glycol is preferably polyalkylene glycol, and more preferably polyethylene glycol or polypropylene glycol.

In addition, when the polymerizable composition includes (poly)alkylene glycol, from the viewpoint of improving the effect of suppressing the striae of the obtained molded product, the content of (poly)alkylene glycol in the polymerizable composition is preferably 0.01 to 1% by weight, more preferably 0.05 to 0.5% by weight, and even more preferably 0.05 to 0.3% by weight with respect to 100% by weight of the polymerizable composition.

In addition, from the viewpoint of improving the balance between the effect of suppressing the striae of the obtained molded product and the effect of improving the transparency of the molded product while extending the pot life of the polymerizable composition, the polymerizable composition of the present embodiment preferably includes an ester compound and an ether compound as a modifier; more preferably includes an ester compound, an ether compound, and (poly)alkylene glycol; and even more preferably includes compounds represented by General Formulas (9b) to (14b). The compounds represented by General Formulas (9b) to (11b) are ester compounds, the compounds represented by General Formulas (12b) and (13b) are ether compounds, and the compound represented by General Formula (14b) is (poly)alkylene glycol.

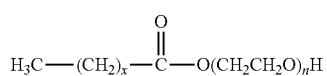

$$H_3C-(CH_2)_x-\overset{O}{\overset{\|}{C}}-O(CH_2CH_2O)_nH \quad (9b)$$

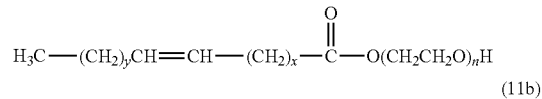

$$H_3C-(CH_2)_y CH=CH-(CH_2)_x-\overset{O}{\overset{\|}{C}}-O(CH_2CH_2O)_nH \quad (10b)$$

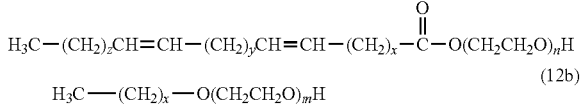

$$H_3C-(CH_2)_z CH=CH-(CH_2)_y CH=CH-(CH_2)_x-\overset{O}{\overset{\|}{C}}-O(CH_2CH_2O)_nH \quad (11b)$$

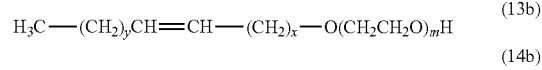

$$H_3C-(CH_2)_x-O(CH_2CH_2O)_mH \quad (12b)$$

$$H_3C-(CH_2)_y CH=CH-(CH_2)_x-O(CH_2CH_2O)_mH \quad (13b)$$

$$HO(CH_2CH_2O)_pH \quad (14b)$$

In General Formulas (9b) to (14b), x, y, z, m, n, and p are the same as x, y, z, m, n, and p in General Formulas (2b) and (4b) to (8b), respectively.

From the viewpoint of improving the balance of the effect of extending the pot life of the polymerizable composition, the effect of improving the transparency of the obtained molded product, and the effect of suppressing the striae in the molded product, x in General Formula (9b) is preferably 9 to 17, and more preferably 11 to 15.

From the same viewpoint, n is preferably 2 to 18, and more preferably 2 to 16.

From the same viewpoint, x+y in General Formula (10b) is preferably 9 to 17, and more preferably 11 to 15. From the same viewpoint, n is preferably 2 to 18, and more preferably 2 to 17.

From the same viewpoint, x+y+z in General Formula (11b) is preferably 9 to 15, and more preferably 11 to 13. From the same viewpoint, n is preferably 2 to 18, and more preferably 2 to 16.

From the same viewpoint, x in General Formula (12b) is preferably 12 to 20, and more preferably 14 to 18. From the same viewpoint, m is preferably 1 to 19, and more preferably 2 to 18.

In addition, from the same viewpoint, x+y in General Formula (13b) is preferably 12 to 17, and more preferably 14 to 16. From the same viewpoint, m is preferably 1 to 19, and more preferably 1 to 18.

In addition, from the same viewpoint, p in General Formula (14b) is preferably 1 to 20, and more preferably 2 to 20.

[Other Components Such as Additives]

The polymerizable composition of the present embodiment may include components other than the modifiers such as the polymerization reactive compound and polyether-modified compound, ester compound, ether compound, or the like.

Examples thereof include monofunctional iso(thio)cyanate compounds, monofunctional (thio)epoxy compounds, monofunctional oxetanyl compounds, monofunctional thietanyl compounds, monofunctional (meth)acryloyl compounds having one functional group arbitrarily selected from methacryloyloxy groups, acryloyloxy groups, methacryloylthio groups, acryloylthio groups, methacrylamide groups, and acrylamide groups, monofunctional alkene compounds having one polymerizable carbon-carbon double bond other than methacryloyloxy groups, acryloyloxy groups, methacryloylthio groups, acryloylthio groups, methacrylamide group, or acrylamide groups, monofunctional alcohol compounds other than alcohol, which is used as a solvent, monofunctional thiol compounds, monofunctional amine compounds having one functional group arbitrarily selected from amino groups and secondary amino groups, monofunctional carboxylic acid compounds having one carboxyl group, solvents, moisture and the like.

In the process of cast polymerizing the composition of the present embodiment to produce a molded product, as necessary, a polymerization catalyst or a thermal polymerization initiator is added in a case of curing by heat, and a photopolymerization initiator is added in a case of curing by irradiation with other than with infrared (heat), such as ultraviolet rays.

Examples of polymerization catalysts include a Lewis acid, amines, tertiary amine compounds and inorganic acid salts or organic acid salts thereof, metal compounds, quaternary ammonium salts, organic sulfonic acids, and the like.

The usage amount of the polymerization catalyst with respect to the polymerizable composition is preferably in the range of 5 ppm to 15% by weight, more preferably in the range of 10 ppm to 10% by weight, and even more preferably in the range of 50 ppm to 3% by weight.

Examples of metal compounds used as polymerization catalysts include dimethyltin chloride, dibutyltin chloride, dibutyltin laurate, and the like.

Examples of the thermal polymerization initiator to be used include ketone peroxide compounds such as methyl isobutyl ketone peroxide and cyclohexanone peroxide; diacyl peroxide compounds such as isobutyryl peroxide, o-chlorobenzoyl peroxide, and benzoyl peroxide; dialkyl peroxide compounds such as tris(t-butylperoxy)triazine and t-butyl cumyl peroxide;

peroxyketal compounds such as 1,1-di(t-hexylperoxy) cyclohexane, 2,2-bis(4,4-di-t-butylperoxycyclohexyl)propane, and 2,2-di(t-butylperoxy)butane;

alkyl per ester compounds such as α-cumyl peroxyneodecanoate, t-butyl peroxypivalate, 2,4,4-trimethylpenyl peroxy-2-ethylhexanoate, t-butylperoxy-2-ethylhexanoate, and t-butylperoxy-3,5,5-trimethylhexanoate;

peroxycarbonate compounds such as di-3-methoxybutyl peroxydicarbonate, bis(4-t-butylcyclohexyl)peroxydicarbonate, t-butylperoxyisopropylcarbonate, and diethylene glycol bis(t-butylperoxycarbonate); and the like.

Examples of the photopolymerization initiator to be used include a photoradical polymerization initiator, a photocationic polymerization initiator, a photoanionic polymerization initiator, and the like, and, among these photopolymerization initiators, a photoradical polymerization initiator is preferable.

Examples of photoradical polymerization initiators include Irgacure 127 (manufactured by BASF), Irgacure 651 (manufactured by BASF), Irgacure 184 (manufactured by BASF), Darocure 1173 (manufactured by BASF), benzophenone, 4-phenylbenzophenone, Irgacure 500 (manufactured by BASF), Irgacure 2959 (manufactured by BASF), Irgacure 907 (manufactured by BASF), Irgacure 369 (manufactured by BASF), Irgacure 1300 (manufactured by BASF), Irgacure 819 (manufactured by BASF), Irgacure 1800 (manufactured by BASF), Darocure TPO (manufactured by BASF), Darocure 4265 (manufactured by BASF), Irgacure OXE 01 (manufactured by BASF), Irgacure OXE 02 (manufactured by BASF), Esacure KT 55 (manufactured by Lamberti), Esacure ONE (manufactured by Lamberti), Esacure KIP 150 (manufactured by Lamberti), Esacure KIP 100 F (manufactured by Lamberti), Esacure KT 37 (manufactured by Lamberti), Esacure KTO 46 (manufactured by Lamberti), Esacure 1001M (manufactured by Lamberti), Esacure KIP/EM (manufactured by Lamberti), Esacure DP250 (manufactured by Lamberti), Esacure KB 1 (manufactured by Lamberti), 2,4-diethylthioxanthone, and the like.

Among these photoradical polymerization initiators, Irgacure 127 (manufactured by BASF), Irgacure 184 (manufactured by BASF), Darocure 1173 (manufactured by BASF), Irgacure 500 (manufactured by BASF), Irgacure 819 (manufactured by BASF), Darocure TPO (manufactured by BASF), Esacure ONE (manufactured by Lamberti), Esacure KIP 100 F (manufactured by Lamberti), Esacure KT 37 (manufactured by Lamberti), Esacure KTO 46 (manufactured by Lamberti), and the like are preferable.

Examples of photocationic polymerization initiators include Irgacure 250 (manufactured by BASF), Irgacure 784 (manufactured by BASF), Esacure 1064 (manufactured by Lamberti), Cyraure UVI 6990 (manufactured by Union Carbide Japan Ltd.), Adeka Optomer SP-172 (manufactured by ADEKA), Adeka Optomer SP-170 (manufactured by ADEKA), Adeka Optomer SP-152 (manufactured by ADEKA), Adeka Optomer SP-150 (manufactured by ADEKA), and the like.

In a case where the photopolymerization initiator is used, a photopolymerization accelerator may be used in combination therewith. Examples of photopolymerization accelerators include 2,2-bis(2-chlorophenyl)-4,5'-tetraphenyl-2'H-<1,2'>biimidazoleyl, tris(4-dimethylaminophenyl)methane, 4,4'-bis(dimethylamino) benzophenone, 2-ethylanthraquinone, camphorquinone, and the like.

The usage amount of the photopolymerization initiator and the thermal polymerization initiator in the polymerizable composition is preferably in the range of 0.1 to 20% by weight, more preferably in the range of 0.5 to 10% by weight, and even more preferably in the range of 1 to 5% by weight.

In the process of cast polymerizing the composition in the present embodiment to produce a molded product, an internal release agent may be added as necessary.

As the internal release agent, it is possible to use an acidic phosphate ester. Examples of acidic phosphate esters include phosphoric monoesters and phosphoric acid diesters, which may be used alone or in a combination of two or more kinds.

It is possible to represent the acidic phosphate ester used as an internal release agent by General Formula (1).

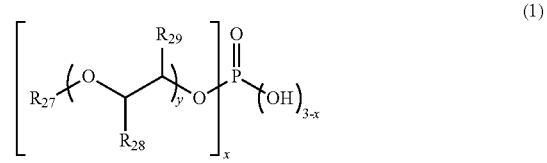

In General Formula (1), x represents an integer of 1 or 2, y represents an integer of 0 to 18, $R_{27}$ represents an alkyl group having 1 to 20 carbon atoms, $R_{28}$ and $R_{29}$ each independently represents a hydrogen atom, a methyl group, or an ethyl group. The number of carbon atoms in $[\ ]_x$ is preferably 4 to 20. A plurality of present $R_{27}$'s, a plurality of present $R_{28}$'S, or a plurality of present $R_{29}$'S may be the same as or different from each other.

Examples of $R_{27}$ in General Formula (1) include organic residues derived from linear aliphatic compounds such as methane, ethane, propane, butane, pentane, hexane, heptane, octane, nonane, decane, undecane, dodecane, tetradecane, and hexadecane; organic residues derived from branched aliphatic compounds such as 2-methylpropane, 2-methylbutane, 2-methylpentane, 3-methylpentane, 3-ethylpentane, 2-methylhexane, 3-methylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, and 4-propyloctane; organic residues derived from alicyclic compounds such as cyclopentane, cyclohexane, 1,2-dimethylcyclohexane, 1,3-dimethylcyclohexane, and 1,4-dimethylcyclohexane, and it is possible to use at least one kind selected from the above. Note that the present invention is not limited only to these exemplified compounds. It is possible to use at least one kind or a mixture of two or more kinds of acidic phosphate esters.

In General Formula (1), y is preferably 0 or 1.

In a case where y is 0, $R_{27}$ is preferably a linear or branched alkyl group having 4 to 12 carbon atoms, and more preferably a linear alkyl group having 4 to 12 carbon atoms.

In a case where y is 1, $R_{27}$ is preferably a linear or branched alkyl group having 1 to 20 carbon atoms, and is preferably a linear or branched alkyl group having 3 to 12 carbon atoms.

It is possible to use the acidic phosphate ester as one kind or a mixture of two or more kinds selected from the above.

Examples of acidic phosphate esters include ZelecUN (manufactured by STEPAN), MR internal release agents (manufactured by Mitsui Chemicals, Inc.), the JP series manufactured by Johoku Chemical Co., Ltd., the phosphanol series manufactured by Toho Chemical Industry Co., Ltd., the AP and DP series manufactured by Daihachi Chemical Industry Co., Ltd., and ZelecUN (manufactured by STEPAN Co.) and MR internal release agents (manufactured by Mitsui Chemicals, Inc.) are more preferable.

In order to prevent the molded product formed of the cured resin in the present embodiment from deteriorating even when exposed to the outside for a long period of time, it is desirable to further add an ultraviolet absorber and a hindered amine light stabilizer to the composition in the present embodiment and have a composition imparted with weatherability.

The ultraviolet absorber described above is not particularly limited, and, for example, it is possible to use various ultraviolet absorbers such as a benzotriazole-based ultraviolet absorber, a triazine-based ultraviolet absorber, a benzophenone-based ultraviolet absorber, a benzoate-based ultraviolet absorber, a propanedioic acid ester-based ultraviolet absorber, or an oxanilide-based ultraviolet absorber.

Specific examples thereof include benzotriazole-based ultraviolet absorbers such as 2-(2H-benzotriazole-2-yl)-4-methyl-6-(3,4,5,6-tetrahydrophthalimidylmethyl)phenol, 2-(2H-benzotriazole-2-yl)-p-cresol, 2-(2H-benzotriazole-2-yl)-4-tert-butylphenol, 2-(2H-benzotriazole-2-yl)-4,6-di-tert-butylphenol, 2-(2H-benzotriazole-2-yl)-4,6-bis(1-methyl-1-phenylethyl)phenol, 2-(2H-benzotriazole-2-yl)-4-(1,1,3,3-tetramethylbutyl)-6-(1-meth yl-1-phenylethyl)phenol, 2-(2H-benzotriazole-2-yl)-4-(3-on-4-oxa-dodecyl)-6-tert-butyl-phenol, 2-{5-chloro (2H)-benzotriazole-2-yl}-4-(3-on-4-oxa-dodecyl)-6-tert-butyl-phenol, 2-{5-chloro(2H)-benzotriazole-2-yl}-4-methyl-6-tert-butyl-phenol, 2-(2H-benzotriazole-2-yl)-4,6-di-tert-pentylphenol, 2-{5-chloro (2H)-benzotriazole-2-yl}-4,6-di-tert-butylphenol, 2-(2H-benzotriazole-2-yl)-4-tert-octylphenol, 2-(2H-benzotriazole-2-yl)-4-methyl-6-n-dodecylphenol, 3-[3-tert-butyl-5-(5-chloro-2H-benzotriazole-2-yl)-4-hydroxyphenyl]octylpropionic acid, 3-[3-tert-butyl-5-(5-chloro-2H-benzotriazole-2-yl)-4-hydroxyphenyl]propionic acid 2-ethylhexyl, a reaction product of methyl-3-{3-(2H-benzotriazole-2-yl)-5-tert-butyl-4-hydroxy-phenyl}propionate/polyethylene glycol 300, trade name Viosorb 583 (manufactured by Kyodo Chemical Co., Ltd.), trade name Tinuvin 326 (manufactured by BASF), trade name Tinuvin 384-2 (manufactured by BASF), trade name Tinuvin PS (manufactured by BASF), trade name Seesorb 706 (manufactured by Shipro Kasei Kaisha, Ltd.), and trade name Eversorb 109 (manufactured by Everlight Chemical Industrial Corp.); triazine-based ultraviolet absorbers such as 2-(4-phenoxy-2-hydroxy-phenyl)-4,6-diphenyl-1,3,5-triazine, 2-(2-hydroxy-4-oxa-hexadecyloxy)-4,6-di(2,4-dimethyl-phenyl)-1,3,5-triazine, 2-(2-hydroxy-4-oxa-heptadecyloxy)-4,6-di(2,4-dimethyl-phenyl)-1,3,5-triazine, 2-(2-hydroxy-4-iso-octyloxy-phenyl)-4,6-di(2,4-dimethyl-phenyl)-1,3,5-triazine, trade name Tinuvin 400 (manufactured by BASF), trade name Tinuvin 405 (manufactured by BASF), trade name Tinuvin 460 (manufactured by BASF), and trade name Tinuvin 479 (manufactured by BASF); benzophenone-based ultraviolet absorbers such as 2-hydroxy-4-n-methoxybenzophenone and 2-hydroxy-4-n-octoxybenzophenone; benzoate-based ultraviolet absorbers such as 2,4-di-tert-butyl phenyl-3,5-di-tert-butyl-4-hydroxybenzoate; propanedioc acid ester-based ultraviolet absorbers such as propanedioc acid-{(4-methoxyphenyl)-methylene}-dimethylester, trade name Hostavin PR-25 (manufactured by Clariant Japan Co., Ltd.), and trade name Hostavin B-CAP (manufactured by Clariant Japan Co., Ltd.); oxanilide-based ultraviolet absorbers such as 2-ethyl-2'-ethoxy-oxanilide, trade name Sanduvor VSU (manufactured by Clariant Japan Co., Ltd.); and the like. Among these ultraviolet absorbers, benzotriazole-based and triazine-based ultraviolet absorbers tend to be preferable.

Further, a light-control dye or a light-control coloring agent may be added for the purpose of imparting light-control properties. It is possible to use one or two or more kinds from representative light-control dyes or light-control coloring agents from spiropyran-based compounds, spirooxazine-based compounds, fulgide-based compounds, naphthopyran-based compounds, and bisimidazole compounds, according to the desired coloration.

The composition in the present embodiment may further have added thereto, as necessary, various additives such as a polymerization accelerator, a catalyst, an infrared absorber, a radical scavenger, an antioxidant, a polymerization inhibitor, a non-light-control coloring agent and dye, a binder, a dispersant, an antifoaming agent, and nanometer-sized organic or inorganic particles.

A cured resin obtained by thermally polymerizing the composition in the present embodiment and a molded product formed of the resin are produced by adding a polymerization reactive compound and various additives and the like as described above as necessary. In addition, a polymerization reactive compound and additives and the like not described in this application may be added to the composition in the present embodiment within a range not impairing the effect of the present invention.

The cured resin forming the molded product in the present embodiment is preferably a cured resin obtained from a liquid polymerizable composition with which it is easy to carry out a casting operation and, among such cured resins, the cured resins in (a) to (z) below are preferable.

(a) A poly(thio)urethane resin obtained by polymerizing a polyiso(thio)cyanate compound and a poly(thi)ol compound In the present application, poly(thio)urethane resin means a polyurethane resin, a polythiourethane resin, or a polydithiourethane resin.

(b) A poly(thio)urea resin obtained by polymerizing a polyisocyanate compound or a polyisothiocyanate compound and a polyamine compound In the present application, poly(thio)urea resin means a polyurea resin or a polythiourea resin.

(c) A poly(thio)epoxy resin obtained by polymerizing a (thio)epoxy compound (d) A poly(thio)epoxy-poly(thi)ol resin obtained by polymerizing a (thio)epoxy compound and a poly(thi)ol compound (e) A poly(thio)epoxy-polyamine resin obtained by polymerizing a (thio)epoxy compound and a polyamine compound (f) A poly(thio)epoxy-acid anhydride resin obtained by polymerizing a (thio)epoxy compound and an acid anhydride (g) A poly(meth)acryloyl resin obtained by polymerizing a (meth)acryloyl compound (h) A poly(meth)acryloyl-poly(thi)ol resin obtained by polymerizing a (meth)acryloyl compound and a poly(thi)ol compound (i) A poly(meth)acryl-polyalkene resin obtained by polymerizing a (meth)acryloyl compound and an alkene compound (j) A poly(meth)acryl-polyalkyne resin obtained by polymerizing a (meth)acryloyl compound and an alkyne compound (k) A poly(meth)acryl-polyamine resin obtained by polymerizing a (meth)acryloyl compound and a polyamine compound (l) A polyalkene resin obtained by polymerizing an alkene compound (m) A polyalkene-poly(thi)ol resin obtained by polymerizing an alkene compound and a poly(thi)ol compound (n) A polyalkene-polyamine resin obtained by polymerizing an alkene compound and a polyamine compound (o) A polyalkyne resin obtained by polymerizing an alkyne compound (p) A polyalkyne-poly(thi)ol resin obtained by polymerizing an alkyne compound and a poly(thi)ol compound (q) A polyalkyne-polyamine resin obtained by polymerizing an alkyne compound and a polyamine compound (r) A polyalkyne-polyalkene resin obtained by polymerizing an alkyne compound and an alkene compound (s) A polyoxetanyl resin obtained by polymerizing an oxetanyl compound (t) A polyoxetanyl-poly(thi)ol resin obtained by polymerizing an oxetanyl compound and a poly(thi)ol compound (u) A polyoxetanyl-polyamine resin obtained by polymerizing an oxetanyl compound and a polyamine compound (v) A polyoxetanyl-acid anhydride resin obtained by polymerizing an oxetanyl compound and an acid anhydride (w) A polythietanyl-poly(thi)ol resin obtained by polymerizing a thietanyl compound and a poly(thi)ol compound (x) A polythietanyl-polyamine resin obtained by polymerizing a thietanyl compound and a polyamine compound (y) A polythietanyl-acid anhydride resin obtained by polymerizing a thietanyl compound and an acid anhydride (z) A mixed resin in which two or more kinds selected from (a) to (y) are copolymerized Among the cured resins in (a) to (z) described above, more preferable examples of cured resins are the resins described in (a) to (i) and (s) to (z) and mixed resins thereof (a mixture of copolymers and resins), and more preferable cured resins include the cured resins described in (a) to (f), (s) to (v), and (z) and mixed resins thereof.

It is possible to carry out the process for producing a plastic lens of the present invention using the apparatus for producing a plastic lens of the present invention.

The apparatus for producing a plastic lens of the present invention is provided with a preparation tank provided with a stirring unit configured to stir and mix a solution including a polymerization reactive compound to prepare a polymerizable composition, and a discharge port for discharging the obtained polymerizable composition; a lens casting mold provided with an injection port and curing the polymerizable composition transported to an interior through the injection port to obtain a molded product; a pipe for connecting the discharge port and the injection port to each other and transporting the polymerizable composition in the preparation tank into the lens casting mold; and a mixing unit installed in at least a part of the pipe and configured to re-mix the polymerizable composition discharged from the preparation tank and inject the polymerizable composition into the lens casting mold.

Description will be given below of an embodiment of a process for producing a plastic lens of the present invention using a plastic lens producing apparatus.

Description will be given of embodiments of a plastic lens producing apparatus with reference to the drawings as appropriate. Here, in all the drawings, similar components are denoted by the same reference numerals, and description thereof will not be repeated as appropriate. First, description will be given of an apparatus for producing a plastic lens.

First Embodiment

<Plastic Lens Producing Apparatus>

As shown in FIG. 1, an apparatus 10 for producing a plastic lens of the present embodiment includes a preparation tank 20 provided with a stirring unit 22 for stirring and mixing a solution including a polymerization reactive compound to prepare a polymerizable composition, and a discharge port 24 for discharging the obtained polymerizable composition; a lens casting mold 30 provided with an injection port 32 and curing the polymerizable composition transported to an interior through the injection port 32 to obtain a molded product; a pipe 40 for connecting the discharge port 24 and the injection port 32 and transferring the polymerizable composition in the preparation tank 20 into the lens casting mold 30; and a mixer 50 installed in the pipe 40 for transporting the polymerizable composition discharged from the preparation tank 20 while mixing and injecting the polymerizable composition into a cavity 38 of the lens casting mold 30.

The plastic lens producing apparatus 10 of the present embodiment is provided with the mixer 50 at this position, and, in particular, it is possible to remarkably reduce the striae caused by injection striations by re-mixing immediately before injection into the cavity 38 of the lens casting mold 30 even with a polymerizable composition having a short pot life and for which the viscosity easily rises, or a polymerizable composition having high viscosity at the time of preparation.

In the preparation tank 20, the polymerization reactive compound and other components are mixed. The preparation tank 20 is provided with a plurality of supply sections (not shown) for supplying the polymerization reactive compound and other components, and is able to supply these to an interior 26 of the preparation tank 20. The preparation tank 20 may be provided with a cooling unit and it is possible to carry out cooling when stirring and mixing the polymerization reactive compound and other components supplied into the preparation tank 20. A vacuum pump may be provided and it is possible to carry out degassing on the air included in the composition after the polymerizable composition is prepared. Furthermore, an inert gas supply section (not shown) may be provided, and it is possible to discharge the obtained polymerizable composition by pressurizing the interior of the preparation tank 20 with an inert gas such as nitrogen, through the discharge port 24. It is also possible to carry out the discharging using a pump.

It is possible to form the preparation tank 20 of a stainless-steel material or the like. The upper part of the stirring unit 22 is connected to the driving section and is able to be rotated at a predetermined number of rotations.

The lens casting mold 30 includes a first mold substrate 36a having a concave surface for forming a convex objective surface of the plastic lens molded product, a second mold substrate 36b arranged to face the first mold substrate 36a, and a fixing member 34 for covering the outer edges of the first mold substrate 36a and the second mold substrate 36b and fixing these to be separated at a predetermined distance.

In the lens casting mold 30, generally, a mirror-polished first mold substrate 36a and the second mold substrate 36b are fixed by the fixing member 34 such as a tape or a gasket.

Materials for the first mold substrate 36a and the second mold substrate 36b include glass, plastic, metal, and the like, but are not limited thereto. A releasing agent may be applied to the first mold substrate 36a and the second mold substrate 36b in advance in order to improve the releasability of the obtained lens. In addition, a coating liquid for imparting a hard coat performance to the lens material may be applied to the mold in advance.

Usually, tapes are used in which an adhesive agent such as a siloxane-based adhesive agent, a (meth)acrylic-based adhesive agent, an epoxy-based adhesive agent, and a rubber-based adhesive agent is coated on a base material such as polyethylene, polypropylene, polyethylene terephthalate, polyethylene isophthalate, polyethylene naphthalate, polyphenylene sulfide, polyester, polycarbonate, polyvinylchloride, Teflon (registered trademark), polysiloxane resin, polyimide resin, cellulose, or the like or a mixture/copolymer thereof or the like. Usually, a tape is used with a thickness in the range of 10 to 200 μm in view of operability, dimensional stability of the molded product, airtightness near the boundary line of the overlapping part, strength, and the like.

Generally, for a gasket, it is possible to suitably use a molded product obtained by using a thermoplastic resin, and from the viewpoints of moldability, flexibility, heat resistance, monomer resistance stability, price, and the like, olefin-based elastomers are often used. Specific examples of the olefin-based elastomers include a polyethylene-based elastomer formed of low density polyethylene, a polypropylene-based elastomer in which a rubber component is finely dispersed in a polypropylene homopolymer, an ethylene-vinyl acetate copolymer, an ethylene-alkylacrylate copolymer, and the like.

The fixing member 34 is provided with the injection port 32, and it is possible to inject the polymerizable composition into the cavity 38 of the lens casting mold 30 through the injection port 32.

The pipe 40 connects the discharge port 24 and the injection port 32 and communicates between the interior 26 of the preparation tank 20 and the cavity 38 of the lens casting mold 30. Due to this, it is possible to transport the polymerizable composition into the lens casting mold through the pipe 40. Here, a filtering apparatus (not shown) may be provided.

It is possible to form the pipe 40 of stainless-steel material or the like. A valve 42 is provided in the pipe 40, and it is possible to adjust the discharge amount of the polymerizable composition from the discharge port 24. The length of the pipe 40 is preferably 0.5 to 5 m.

The mixer 50 is able to mix the polymerizable composition discharged from the preparation tank 20 and transported in the pipe 40 while passing through the interior of the mixer 50. Then, it is possible to inject the polymerizable composition into the cavity 38 of the lens casting mold 30 through the injection port 32. A plurality of mixers 50 may be installed in the pipe 40.

Examples of the mixer 50 include a motionless mixer or a dynamic mixer.

The motionless mixer is a mixer which is not provided with a driving section and which is provided with a columnar container, a plurality of mixing blades fixed in the container and twisted in the radial direction of the columnar container, and an injection port and a discharge port at both ends of the container. The polymerizable composition injected from the injection port is mixed and made uniform at the same time by being passed through the columnar container. Then, the uniform polymerizable composition is discharged from the discharge port and injected into the cavity 38 of the lens casting mold 30 through the injection port 32. Examples of such a motionless mixer include a static mixer (product number N40-172-0, manufactured by Noritake Co., Ltd.) and the like.

A dynamic mixer is provided with columnar containers, a shaft inserted from one side of the containers along the center axis direction, a stirring blade wound in a screw shape along the outer circumferential surface of the shaft, and an injection port and a discharge port at both ends of the container. A driving section is provided on the upper part of the shaft and the stirring blade is rotated by rotating the shaft, and the polymerizable composition injected from the injection port is mixed and made uniform by stirring while being transported in the columnar container. Then, the uniform polymerizable composition is discharged from the discharge port and injected into the cavity 38 of the lens casting mold 30 through the injection port 32. Examples of such a dynamic mixer include an in-line homogenizer (product number UTL 25, manufactured by IKA) or the like.

<Process for Producing Plastic Lens>

The process for producing the plastic lens of the present embodiment includes the following steps.

Step a: A solution including the polymerization reactive compound is stirred and mixed in the interior 26 of the preparation tank 20.

Step b: The polymerizable composition obtained in step a is discharged from the preparation tank 20 and transferred to the mixer 50, and then the polymerizable composition is transferred while being re-mixed by being passed through the mixer 50. Then, the polymerizable composition is injected into the cavity 38 of the lens casting mold 30.

Step c: The polymerizable composition is cured in the lens casting mold 30.

Step d: The cured resin is released from the lens casting mold 30 to obtain a plastic lens molded product.

The process for producing the plastic lens of the present embodiment is provided with a step of transferring the polymerizable composition while carrying out re-mixing and injecting the polymerizable composition into a lens casting mold, in particular, it is possible to remarkably reduce the striae caused by injection striations by re-mixing immediately before injection into the cavity 38 of the lens casting mold 30 even with a polymerizable composition having a short pot life and for which the viscosity easily rises, or a polymerizable composition having high viscosity at the time of preparation.

(Step a)

The order of adding the polymerization reactive compound and other components and the addition rate are not particularly limited and are able to be set arbitrarily.

Suitable conditions for the solution including the polymerization reactive compound vary depending on the capacity, the shape of the stirring blade, and the like, but the polymerization reactive compound is stirred by the stirring unit 22 at a stirring speed of approximately 50 to 500 rpm and for approximately 0.5 to 1.0 hour. In addition, the temperature of the solution during stirring is approximately 10° C. to 20° C.

After preparing the polymerizable composition, a degassing treatment is carried out under reduced pressure.

From the viewpoint of the effect of the present invention, it is possible to set the viscosity of the polymerizable composition prepared in step a at 20° C. to preferably 10 to 1,000 mPa·s, more preferably 50 to 1,000 mPa·s, and particularly preferably 50 to 500 mPa·s. It is possible to measure the viscosity using a B type viscometer (Brookfield Engineering/model number: LVT, rotor No. 2, number of rotations of rotor 30 rpm).

(Step b)

The polymerizable composition obtained by step a is discharged from the preparation tank 20 through the discharge port 24, and transferred to the mixer 50 through the pipe 40.

In order to discharge from the preparation tank 20, it is possible to use the pressure of the interior 26. In addition, it is also possible to carryout the discharging using a pump (not shown) provided in the preparation tank 20. The discharge amount is adjusted by the valve 42 based on the processing capability of the mixer 50 and the discharging may be continuous or intermittent. Here, it is possible for the polymerizable composition to be filtered by a filtration device provided in the pipe 40.

The polymerizable composition transferred to the mixer 50 passes through the inside of the mixer 50 and is re-mixed at that time. In the motionless mixer, the re-mixing is carried out with a supply (transfer) rate of 0.5 to 50 ml/s, a temperature of the polymerizable composition of 10° C. to 20° C., and an internal pressure of 1.1 to 1.5 kg/cm$^2$.

Stirring in the dynamic mixer is carried out at a supply (transfer) rate of 0.5 to 50 ml/s, a rotational speed of 10 to 1,000 rpm, a temperature of the polymerizable composition of 10° C. to 20° C., and an internal pressure of 1.1 to 1.5 kg/cm$^2$.

Then, the polymerizable composition which passed through the mixer 50 is injected into the cavity 38 of the lens casting mold 30 through the injection port 32. Here, in order to set the viscosity of the polymerizable composition at the time of injection into the lens casting mold 30 within the following range, it is preferable that the solution is transferred from the mixer 50 to the lens casting mold 30 in a short time. That is, it is preferable that the apparatus for producing a plastic lens of the present embodiment is formed such that the distance between the discharge port of the mixer 50 and the injection port 32 of the lens casting mold 30 is short.

When the polymerizable composition is injected into the cavity 38 of the lens casting mold 30, it is possible to set the viscosity of the polymerizable composition at 20° C. to preferably 10 to 1,000 mPa·s, more preferably 50 to 1,000 mPa·s, and particularly preferably 50 to 500 mPa·s. It is possible to measure the viscosity of the polymerizable composition using a B type viscometer (Brookfield Engineering/model number: LVT, rotor No. 2, number of rotations of rotor 30 rpm).

With the polymerizable composition in this viscosity range, in a case where the polymerizable composition is injected into the cavity of the lens mold, the generation of injection striations is further suppressed, and as a result, it is possible to effectively suppress the generation of striae.

(Step c)

Next, the polymerizable composition injected into the cavity 38 of the lens casting mold 30 is cured.

Specifically, the composition is polymerized by heating the lens casting mold 30 into which the polymerizable composition is injected in a heatable apparatus such as an oven or hot water or by irradiating the lens casting mold 30 with active energy rays, and then cured and formed into a resin.

The polymerization curing temperature is not limited since the conditions are different depending on the composition of the polymerizable composition, the kind of catalyst, the shape of the mold, and the like, but the polymerization curing is carried out at a temperature of −50° C. to 200° C. for 1 to 100 hours.

Normally, the polymerization curing is started at a temperature in the range of 0° C. to 40° C., the temperature is gradually raised to 80° C. to 150° C., heating is carried out at that temperature for 1 to 6 hours, and then cooling is generally carried out gradually.

In the case of performing polymerization by heating, since the polymerization temperature is influenced by conditions such as the kind and amount of the monomer and the catalyst (polymerization initiator), the temperature is not limited, but is usually in the range of −50° C. to 200° C., preferably in the range of −20° C. to 170° C., and more preferably in the range of 0° C. to 150° C. It is preferable to use gradual heating from a low temperature to a high temperature to carry out the polymerization.

The polymerization time is influenced by the polymerization temperature, but is usually 0.01 to 200 hours, and preferably 0.05 to 100 hours. In addition, as necessary, it is also possible to carry out polymerization at a low temperature, a rising temperature, or a combination of several temperatures by raising and lowering the temperature, or the like.

It is also possible to carry out the polymerization by irradiation with active energy rays such as electron beams, ultraviolet rays, and visible rays, and radical polymerization catalysts or cationic polymerization catalysts which initiate polymerization by active energy rays are used as required.

Here, it is also possible to produce a plastic polarized lens by fixing a polarizing film in the cavity 38 of the lens casting mold 30.

(Step d)

The cured resin is released from the lens casting mold 30, and it is possible to obtain a plastic lens molded product provided with a convex surface. Here, the thickness of the plastic lens molded product is usually approximately 0.1 to 100 mm.

It is possible to obtain the plastic lens molded product of the present embodiment by performing rounding or a peripheral polishing process known as edge down and washing as necessary. Depending on the shape of the lens casting mold, it is possible to obtain various plastic lens molded products such as a finished lens, a semi-finished lens, a spherical lens, an aspherical lens, a multiple focus lens, and a progressive focus lens.

It is desirable that the plastic lens molded product is subjected to an annealing treatment by heating the released lens for the purpose of reducing distortion due to polymerization. The annealing temperature is usually in the range of 80° C. to 150° C., preferably in the range of 100° C. to 130° C., and more preferably in the range of 110° C. to 130° C. The annealing time is usually in the range of 0.5 to 5 hours, and preferably in the range of 1 to 4 hours.

The plastic lens molded product is used by applying a coating layer on one side or both sides as necessary. Examples of the coating layer include a primer layer, a hard coat layer, an anti-reflection film layer, an anti-fog coating layer, an anti-fouling layer, a water repellent layer, and the like. Each of these coating layers may be used alone, or a plurality of coating layers may be used in multiple layers. In a case where coating layers are applied to both sides, the same coating layers may be applied to each side or different coating layers may be applied.

The coating layer may be combined with each of an ultraviolet absorber for the purpose of protecting the lens and eyes from ultraviolet rays, an infrared absorber for the purpose of protecting the eyes from infrared rays, a light stabilizer or an antioxidant for the purpose of improving the weather resistance of the lens, dyes or pigments for the purpose of enhancing the fashionability of the lenses, photochromic dyes or photochromic pigments, antistatic agents, and other known additives for the purpose of improving the performance of the lens. Various leveling agents may be used for the purpose of improving coatability.

Further, the plastic lens obtained in the present embodiment may be subjected to peripheral polishing, back surface polishing, an anti-static treatment, a dyeing treatment, a light-control treatment, or the like, as necessary.

Such a plastic lens is useful as a lens for eyeglasses, in particular, as a lens for correcting visual acuity.

Second Embodiment

<Plastic Lens Producing Apparatus>

Figure 2:
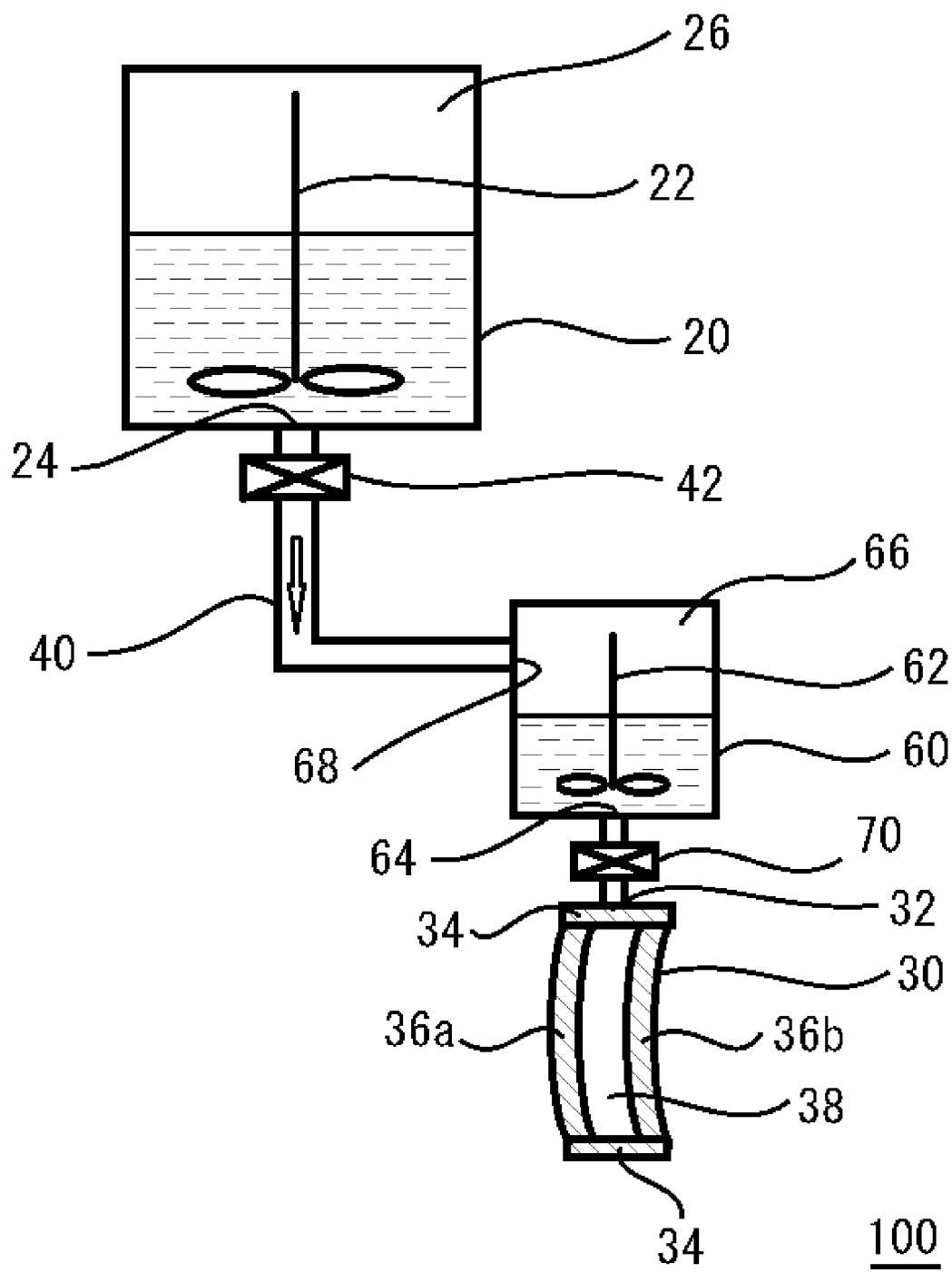
FIG. 2 is a cross-sectional view schematically showing an apparatus for producing a plastic lens used in a second embodiment.

As shown in FIG. 2, the plastic lens producing apparatus 100 of the present embodiment includes the preparation tank 20 provided with the stirring unit 22 for stirring and mixing a solution including a polymerization reactive compound to prepare a polymerizable composition, and the discharge port 24 for discharging the obtained polymerizable composition; the lens casting mold 30 provided with the injection port 32 and curing the polymerizable composition transported to an interior through the injection port 32 to obtain a molded product; the pipe 40 for connecting the discharge port 24 and the injection port 32 and transporting the polymerizable composition in the preparation tank 20 into the cavity 38 of the lens casting mold 30; and a mixing tank 60 installed in the pipe 40 and provided with a stirring unit 62 which stirs and re-mixes the polymerizable composition and a discharge port 64 for injecting the re-mixed polymerizable composition into the cavity 38 of the lens casting mold 30.

Since the plastic lens producing apparatus 100 of the present embodiment is provided with the mixing tank 60 at this position and, in particular, re-mixing is carried out immediately before the injection into the cavity 38 of the lens casting mold 30, it is possible to remarkably reduce the striae caused by injection striations even with a polymerizable composition which has a short pot life and easily increases in viscosity or a polymerizable composition which has a high in viscosity during preparation.

Here, the length of the pipe 40 is preferably 0.5 to 5 m in the same manner as the first embodiment.

Description will be given below of the mixing tank 60 in the present embodiment, and the description of members and the like which are the same as those in the first embodiment will be omitted.

The mixing tank 60 is provided with an injection port 68 to which the polymerizable composition is supplied. The mixing tank 60 may be provided with a cooling unit and it is possible to carry out cooling when stirring the polymerizable composition supplied to an interior 66 of the mixing tank 60. Furthermore, a vacuum pump may be provided, and it is possible to carry out degassing on the air included in the composition after the polymerizable composition is stirred. Furthermore, an inert gas supply section (not shown) may be provided, and it is possible to discharge the polymerizable composition re-mixed by stirring through the discharge port 64 by pressurizing the interior 66 of the mixing tank 60 with an inert gas such as nitrogen. It is also possible to carry out the discharging using a pump.

It is possible to form the preparation tank 20 of a stainless-steel material or the like. The upper part of the stirring unit 62 is connected to the driving section and is able to be rotated at a predetermined number of rotations.

It is possible to form the pipe 40 of a stainless-steel material or the like. A valve 70 is provided in the lower part of the discharge port 64, and it is possible to adjust the discharge amount of the polymerizable composition from the discharge port 64.

<Plastic Lens Producing Method>

The process for producing the plastic lens of the present embodiment includes the following steps.

Step i: A solution including the polymerization reactive compound is stirred and mixed in the interior 26 of the preparation tank 20.

Step ii: The polymerizable composition obtained in step i is discharged from the preparation tank 20 and transferred to the mixing tank 60, and then the polymerizable composition is stirred and re-mixed in the mixing tank 60. Then, the polymerizable composition is injected into the cavity 38 of the lens casting mold 30.

Step iii: The polymerizable composition is cured in the lens casting mold 30.

Step iv: The cured resin is released from the lens casting mold 30 to obtain a plastic lens molded product.

The process for producing the plastic lens of the present embodiment is provided with a step of stirring and re-mixing the polymerizable composition and injecting the polymerizable composition into a lens casting mold, and it is possible to remarkably reduce the striae caused by the injection striations by carrying out re-mixing immediately before injection into the cavity 38 of the lens casting mold 30 even with a polymerizable composition having a short pot life and for which the viscosity easily rises, or a polymerizable composition having high viscosity at the time of preparation.

Step i, step iii, step iv, and subsequent steps in the present embodiment are the same as step a, step c, step d, and subsequent steps in the first embodiment, respectively, thus description thereof will not be repeated.

(Step ii)

The polymerizable composition obtained in step i is discharged from the preparation tank 20 through the discharge port 24 and transferred to the mixing tank 60 through the pipe 40.

It is possible to use the pressure of the interior 26 in order to carry out the discharging from the preparation tank 20. In addition, it is also possible to carry out the discharging using a pump (not shown) provided in the preparation tank 20. The discharge amount is adjusted by the valve 42 based on the processing capability of the mixing tank 60 and the discharging may be continuous or intermittent. Here, it is possible for the polymerizable composition to be filtered by a filtration device provided in the pipe 40.

The conditions for stirring the polymerizable composition vary depending on the capacity, the shape of the stirring blade, and the like, but the stirring is carried out by the stirring unit 62 at a stirring speed of approximately 50 to 500 rpm for approximately 3 to 5 minutes. In addition, the temperature of the polymerizable composition at the time of stirring is approximately 10° C. to 20° C. and it is possible to carry out the stirring under a nitrogen atmosphere.

After the polymerizable composition is stirred and re-mixed, it is possible to carry out a degassing treatment under reduced pressure again.

The re-mixed polymerizable composition is discharged through the discharge port 64 and injected into the cavity 38 of the lens casting mold 30 through the injection port 32. In order to set the viscosity of the polymerizable composition at the time of injection into the lens casting mold 30 within the following range, the solution is preferably transferred from the mixing tank 60 to the lens casting mold 30 in a short time. That is, it is preferable that the apparatus for producing a plastic lens of the present embodiment is formed such that the distance between the discharge port 64 of the mixing tank 60 and the injection port 32 of the lens casting mold 30 is short.

It is possible to use the pressure of the interior 66 in order to carry out the discharging from the mixing tank 60. In addition, it is also possible to carry out discharging by using a pump (not shown) provided in the mixing tank 60. The discharge amount is adjusted by the valve 42.

The viscosity of the polymerizable composition at 20° C. is preferably 10 to 1,000 mPa·s, more preferably 50 to 1,000 mPa·s, and particularly preferably 50 to 500 mPa·s when injected into the cavity 38 of the lens casting mold 30. It is possible to measure the viscosity of the polymerizable composition using a B type viscometer (Brookfield Engineering/model number: LVT, rotor No. 2, number of rotations of rotor 30 rpm).

With the polymerizable composition in this viscosity range, in a case where the polymerizable composition is injected into the cavity of the lens mold, the generation of injection striations is further suppressed, and as a result, it is possible to effectively suppress the generation of striae.

Although the embodiments of the present invention have been described above, these are examples of the present invention, and it is possible to adopt various configurations other than the above as long as the effect of the present invention is not impaired.

For example, in the first embodiment, it is also possible to use an apparatus for producing a plastic lens having two or more of the mixers 50 in series, and, in the second embodiment, it is also possible to use an apparatus for producing a plastic lens having two or more of the mixing tanks 60 in series. Furthermore, it is also possible to use an apparatus for producing a plastic lens having one or more of the mixers 50 and one or more of the mixing tanks 60 in series.

EXAMPLES

Detailed description will be given below of the present invention based on Examples, but the present invention is not limited to these Examples. The molded product made of the cured resin and the plastic lens were evaluated by the following method.

Viscosity: The viscosity of the polymerizable composition was measured using a B type viscometer (Brookfield Engineering/model number: LVT, rotor No. 2, number of rotations of rotor 30 rpm).

Striae: The lens was used for projection with an ultrahigh-pressure mercury lamp (light source model OPM-252 HEG: manufactured by Ushio Inc.), and the transmitted image was visually evaluated for the presence or absence of striae.

Refractive index and Abbe number: Measurement was carried out at 20° C. using a refractometer KPR-20 (manufactured by Kalnew Optical Industry Co., Ltd.).

Heat Resistance (Glass Transition Temperature: Tg): Measurement was carried out with a thermomechanical analyzer TMA-60 manufactured by Shimadzu Corporation using the TMA penetration method (50 g load, pin tip 0.5 mmφ, heating rate 10° C./min).

Appearance: The cloudiness of the created lens was visually checked in a dark room, "poor" denotes that cloudiness was found and "good" denotes that cloudiness was not found.

In addition, the modifier used in Examples 3 and 4 below is a mixture including 3% by weight of a compound represented by the following formula (9b), 44% by weight of a compound represented by the formula (10b), 3% by weight of a compound represented by the formula (11b), 9% by weight of a compound represented by the formula (12b), 8% by weight of a compound represented by the formula (13b), 32% by weight of a compound represented by the formula (14b), and a total of 99% by weight of a compound represented by formulas (9b) to (14b).

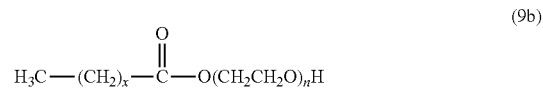

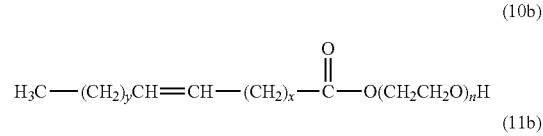

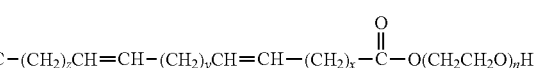

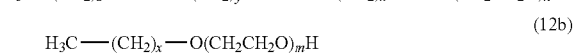

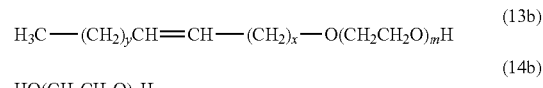

Here, the compound represented by the formula (9b) is a compound in which x=12, n=3 to 15, and a compound in which x=14 and n=2 to 16.

The compound represented by the formula (10b) is a compound in which x+y=12, and n=2 to 16, and a compound in which x+y=14 and n=2 to 17.

The compound represented by the formula (11b) is a compound in which x+y+z=12 and n=2 to 15.

The compound represented by formula (12b) is a compound in which x=15, m=2 to 17 and a compound in which x=17 and m=2 to 17.

The compound represented by the formula (13b) is a compound in which x+y=15 and m=1 to 18.

The compound represented by the formula (14b) is a compound in which p=2 to 20.

Example 1

589.0 parts by weight of bis(4-isocyanatocyclohexyl) methane, 6.40 parts by weight of 2-(3't-butyl-2'-hydroxy-5'-methylphenyl)-5-chlorobenzotriazole (Tinuvin 326), 15.0 parts by weight of Evasorb 109, 0.8 parts by weight of ZelecUN, and 5.0 parts by weight of a polyether-modified siloxane compound (KL-100, manufactured by Kyoeisha Chemical Co., Ltd.) were placed into a preparation tank for mass production, and completely dissolved in a nitrogen atmosphere at 20° C., then a mixed solution of 1.50 parts by weight of dibutyltin dichloride and 411.0 parts by weight of a polythiol compound which is a mixture of 5,7 (or 4,7 or 4,8)-dimercaptomethyl-1,11-mercapto-3,6,9-trithiaundecane was added thereto and stirred and mixed at 20° C. for 20 minutes and then degassed at a reduced pressure of 0.20 kPa for 30 minutes to obtain a polymerizable composition.

The obtained polymerizable composition was transferred through a transferring line formed of, in order, a 1.8 μPTFE filter, a silicon tube having an inner diameter of 6 mm and a length of 2 m, 6.0 mm elements formed of PP in 18 stages, and a static mixer (manufactured by Tech Tool) with a discharge port diameter of 2.4 mm, and then injected at a rate of 5 g/sec at 20° C. from the discharge port of the static mixer into a cavity of a mold having a cavity for creating a lens with a set center thickness of 10 mm formed of a 6-curve glass mold (upper mold) with a diameter of 78 mm and a 4-curve glass mold (lower mold) with a diameter of 78 mm. The viscosity of the polymerizable composition at the time of injection was 90 mPa·s.

Subsequently, the mold into which the polymerizable composition was injected was placed into a polymerization oven and gradually heated to 20° C. to 140° C. over 50 hours for polymerization. After completion of the polymerization, the mold was removed from the oven, and the molded product was released from the inside of the cavity to obtain a lens.

When the presence or absence of striae was observed in each of 100 obtained lenses, no striae at all were found in the lenses having a central thickness of 10 mm in which striae are likely to occur. In addition, when one lens was arbitrarily selected from the prepared lens and subjected to an annealing treatment, and the properties of the resin were measured, the resin exhibited good physical properties and the appearance was "good", the refractive index (ne) was 1.602, the Abbe number (ve) was 39, and Tg was 140° C.

Example 2

After obtaining a polymerizable composition by the same preparation operation as in Example 1, the polymerizable composition was moved to another relay tank while being filtered by a pressurizing method with a 1.8 μPTFE filter and stirred at 20° C. for 3 minutes at a stirring speed of 200 rpm in a stirrer equipped with paddle blades. The resultant was directly injected into a cavity of the same shape used in Example 1 at 20° C. at a rate of 5 g/sec, and polymerization was carried out to obtain a lens. The viscosity of the polymerizable composition at the time of injection was 90 mPa·s.

When the presence or absence of striae was observed in each of 100 obtained lenses, no striae at all were found in the lenses having a central thickness of 10 mm in which striae are likely to occur. In addition, when one lens was arbitrarily selected from the prepared lens and subjected to an annealing treatment, and the properties of the resin were measured, the resin exhibited good physical properties and the appearance was "good", the refractive index (ne) was 1.602, the Abbe number (ve) was 39, and Tg was 140° C.

Example 3

589.0 parts by weight of bis(4-isocyanatocyclohexyl) methane, 6.40 parts by weight of 2-(3't-butyl-2'-hydroxy-5'-methylphenyl)-5-chlorobenzotriazole (Tinuvin 326), 15.0 parts by weight of Evasorb 109, 0.8 parts by weight of ZelecUN, and 5.0 parts by weight of the modifier were placed into a preparation tank for mass production and completely dissolved in a nitrogen atmosphere at 20° C., and then a mixture of 1.50 parts by weight of dibutyltin dichloride and 411.0 parts by weight of a polythiol compound which is a mixture of 5,7 (or 4,7 or 4,8)-dimercaptomethyl-1,11-mercapto-3,6,9-trithiaundecane was added thereto, stirred and mixed at 20° C. for 20 minutes, and then degassed for 30 minutes under a reduced pressure of 0.20 kPa to obtain a polymerizable composition.

The obtained polymerizable composition was transferred through a transferring line formed of a 1.8 μPTFE filter, a silicon tube having an inner diameter of 6 mm and a length of 2 m, 6.0 mm elements formed of PP in 18 stages, and a static mixer (manufactured by Tech Tool) with a discharge port diameter of 2.4 mm, and then injected at a rate of 5 g/sec at 20° C. from the discharge port of the static mixer into a cavity of a mold having a cavity for creating a lens with a set center thickness of 10 mm formed of a 6-curve glass mold (upper mold) with a diameter of 78 mm and a 4-curve glass mold (lower mold) with a diameter of 78 mm. The viscosity of the polymerizable composition at the time of injection was 90 mPa·s.

Subsequently, the mold into which the polymerizable composition was injected was placed into a polymerization oven and gradually heated to 20° C. to 140° C. over 50 hours for polymerization. After completion of the polymerization, the mold was removed from the oven, and the molded product was released from the inside of the cavity to obtain a lens.

When the presence or absence of striae was observed in each of 100 obtained lenses, no striae at all were found in the lenses having a central thickness of 10 mm in which striae are likely to occur. In addition, when one lens was arbitrarily selected from the prepared lens and subjected to an annealing treatment, and the properties of the resin were measured, the resin exhibited good physical properties and the appearance was "good", the refractive index (ne) was 1.602, the Abbe number (ve) was 39, and Tg was 140° C.

Example 4

After obtaining the polymerizable composition by the same preparation operation as in Example 3, the polymerizable composition was moved to another relay tank while being filtered by a pressurizing method with a 1.8 μPTFE filter, and was stirred at 20° C. for 3 minutes at a stirring speed of 200 rpm in a stirrer equipped with paddle blades. The resultant was directly injected into a cavity of the same shape used in Example 3 at 20° C. at a rate of 5 g/sec, and polymerization was carried out to obtain a lens. The viscosity of the polymerizable composition at the time of injection was 90 mPa·s.

When the presence or absence of striae was observed in each of 100 obtained lenses, no striae at all were found in the lenses having a central thickness of 10 mm in which striae are likely to occur. In addition, when one lens was arbitrarily selected from the prepared lens and subjected to an annealing treatment, and the properties of the resin were measured, the resin exhibited good physical properties and the appearance was "good", the refractive index (ne) was 1.602, the Abbe number (ve) was 39, and Tg was 140° C.

Comparative Example 1

The same operation as in Example 1 was carried out to obtain a lens except that the polymerizable composition was injected into the cavity of the mold with a general-purpose injection nozzle having a discharge port diameter of 2.4 mm without installing a static mixer in the transfer line in Example 1. When the presence or absence of striae was observed in each of 100 obtained lenses, striae were found in all the lenses. In addition, one lens was arbitrarily selected from the prepared lens and subjected to an annealing treatment, and the properties of the resin were measured, the resin exhibited good physical properties and the appearance was "good", the refractive index (ne) was 1.602, the Abbe number (ve) was 39, and Tg was 140° C.

Comparative Example 2

The same operation as in Example 3 was carried out to obtain a lens except that the polymerizable composition was injected into the cavity of the mold with a general-purpose injection nozzle having a discharge port diameter of 2.4 mm without installing a static mixer in the transfer line in Example 3. When the presence or absence of striae was observed in each of 100 obtained lenses, striae were found in all the lenses. In addition, one lens was arbitrarily selected from the prepared lens and subjected to an annealing treatment, and the properties of the resin were measured, the resin exhibited good physical properties and the appearance was "good", the refractive index (ne) was 1.602, the Abbe number (ve) was 39, and Tg was 140° C.

This application claims priority based on Japanese Patent Application No. 2015-120599 filed on Jun. 15, 2015, the disclosure of which is incorporated herein in its entirety.

It is possible for the present invention to also take the following aspects.

[1] A process for producing a plastic lens, the method including a step of stirring and mixing a solution including a polymerization reactive compound in a preparation tank; a step of transferring a polymerizable composition obtained in the step from the preparation tank to a lens casting mold; a step of curing the polymerizable composition; and a step of obtaining a plastic lens molded product by separating the obtained resin from a lens casting mold, in which the step of transferring the polymerizable composition includes a step of re-mixing the polymerizable composition discharged from the preparation tank and injecting the polymerizable composition into the lens casting mold.

[2] The process for producing a plastic lens according to [1], in which the step of transferring the polymerizable composition includes a step of transferring the polymerizable composition discharged from the preparation tank while carrying out re-mixing, and injecting the polymerizable composition into the lens casting mold.

[3] The process for producing a plastic lens according to [2], in which the step of transferring the polymerizable composition includes a step of passing the polymerizable composition discharged from the preparation tank inside a motionless mixer, transferring the polymerizable composition while carrying out re-mixing, and injecting the polymerizable composition into the lens casting mold.

[4] The process for producing a plastic lens according to [3], in which the motionless mixer is a static mixer.

[5] The process for producing a plastic lens according to [2], in which the step of transferring the polymerizable composition includes a step of passing the polymerizable composition discharged from the preparation tank inside a dynamic mixer, transferring the polymerizable composition while re-stirring and mixing, and injecting the polymerizable composition into the lens casting mold.

[6] The process for producing a plastic lens according to [1], in which the step of transferring the polymerizable composition includes a step of transferring the polymerizable composition discharged from the preparation tank to a mixing tank, a step of re-stirring and mixing the polymerizable composition in the mixing tank, and a step of injecting the re-stirred and mixed polymerizable composition into a lens casting mold.

[7] The process for producing a plastic lens according to any one of [1] to [6], in which the polymerization reactive compound is at least one kind of compounds selected from a polyiso(thio) cyanate compound, a (thio)epoxy compound, an oxetanyl compound, a thietanyl compound, a (meth) acryloyl compound, an alkene compound, an alkyne compound, a bifunctional or higher active hydrogen compound, and an acid anhydride.

[8] The process for producing a plastic lens according to [7], in which the polymerization reactive compound includes a polyiso(thio) cyanate compound and a bifunctional or higher active hydrogen compound.

[9] The process for producing a plastic lens according to any one of [1] to [8], in which a viscosity of the polymerizable composition is 50 to 1,000 mPa·s at 20° C.

[10] A plastic lens obtained by the producing method according to any one of [1] to [9].

[11] An apparatus for producing a plastic lens including a preparation tank provided with a stirring unit configured to stir and mix a solution including a polymerization reactive compound to prepare a polymerizable composition, and a discharge port for discharging the obtained polymerizable composition; a lens casting mold provided with an injection port and curing the polymerizable composition transported to an interior through the injection port to obtain a molded product; a pipe for connecting the discharge port and the injection port to each other and transporting the polymerizable composition in the preparation tank into the lens casting mold; and a mixing unit installed in at least a part of the pipe and configured to re-mix the polymerizable composition discharged from the preparation tank and inject the polymerizable composition into the lens casting mold.

[12] The apparatus for producing the plastic lens according to [11], in which the mixing unit is a motionless mixer or a dynamic mixer which transfers the polymerizable composition discharged from the preparation tank while mixing and injects the polymerizable composition into the lens casting mold.

[13] The apparatus for producing the plastic lens according to [12], in which the motionless mixer is a static mixer.

[14] The apparatus for producing the plastic lens according to [11], in which the mixing unit is a mixing tank provided with a stirring unit for re-stirring and mixing the polymerizable composition and a discharge port for injecting the re-stirred and mixed polymerizable composition into the lens casting mold.

The invention claimed is:

1. A process for producing a plastic lens comprising:
a step of stirring and mixing a solution including a polymerization reactive compound in a preparation tank;
a step of transferring a polymerizable composition obtained in the step from the preparation tank to a lens casting mold;
a step of curing the polymerizable composition; and
a step of separating a cured resin from the lens casting mold to obtain a plastic lens molded product,
wherein the step of transferring the polymerizable composition includes a step of re-mixing the polymerizable composition discharged from the preparation tank and injecting the polymerizable composition into the lens casting mold,
wherein the solution in the preparation tank further includes a polyether-modified compound which is at least one compound selected from a polyether-modified siloxane compound represented by General Formula (1a) and a polyether-modified (meth)acrylic compound represented by General formula (3a):

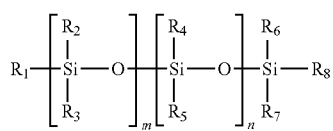
(1a)

wherein $R_1$ to $R_8$ may be the same as or different from each other and at least one of $R_1$ to $R_8$ is a polyether group represented by following General Formula (4a), and the other $R_1$ to $R_8$ may be the same as or different from each other and are a linear or branched alkyl group having 1 to 20 carbon atoms, a linear or branched alkoxy group having 1 to 20 carbon atoms, a hydroxyl group, or a polysiloxy group, a plurality of present $R_2$ to $R_5$ may each be the same as or different from each other, m and n may be the same as or different from each other and are an integer equal to or more than 0,

(4a)

wherein, in General Formula (4a), $R_{25}$ represents a linear or branched alkylene group having 1 to 20 carbon atoms, $R_{26}$ represents a hydrogen atom or a linear or branched alkenyl group having 2 to 20 carbon atoms, a plurality of present $R_{25}$'s may be the same as or different from each other, and k is an integer equal to or more than 1, and

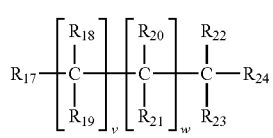
(3a)

wherein $R_{17}$ to $R_{24}$ may be the same as or different from each other, and at least one of $R_{17}$ to $R_{24}$ is a polyether group represented by General Formula (4a), and at least one of $R_{17}$ to $R_{24}$ is a (meth)acryloyl group or a linear or branched alkyl group having 1 to 20 carbon atoms and having a (meth)acryloyl group, and the other $R_{17}$ to $R_{24}$ represent a linear or branched alkyl group having 1 to 20 carbon atoms, and a plurality of present $R_{18}$ to $R_{21}$ may each be the same as or different from each other, v and w may be the same as or different from each other and represent an integer equal to or more than 0,
wherein the polyether-modified siloxane compound represented by General Formula (1a) is combination of a compound in which $R_{26}$ of the General Formula (4a) is a hydrogen atom and a compound in which $R_{26}$ of the General Formula (4a) is a linear or branched alkenyl group having 2 to 20 carbon atoms,
wherein the polymerization reactive compound is at least one compound selected from the group consisting of a polyiso(thio)cyanate compound, a (thio)epoxy compound, an oxetanyl compound, a thietanyl compound, a bifunctional or higher active hydrogen compound, and an acid anhydride.

2. The process for producing a plastic lens according to claim 1,
wherein the step of transferring the polymerizable composition includes a step of transferring the polymerizable composition discharged from the preparation tank while carrying out re-mixing, and injecting the polymerizable composition into the lens casting mold.

3. The process for producing a plastic lens according to claim 2,
wherein the step of transferring the polymerizable composition includes a step of passing the polymerizable composition discharged from the preparation tank inside a motionless mixer, transferring the polymerizable composition while carrying out re-mixing, and injecting the polymerizable composition into the lens casting mold.

4. The process for producing a plastic lens according to claim 3,
wherein the motionless mixer is a static mixer.

5. The process for producing a plastic lens according to claim 2,
wherein the step of transferring the polymerizable composition includes a step of passing the polymerizable composition discharged from the preparation tank inside a dynamic mixer, transferring the polymerizable composition while stirring and re-mixing, and injecting the polymerizable composition into the lens casting mold.

6. The process for producing a plastic lens according to claim 1,
wherein the step of transferring the polymerizable composition includes a step of transferring the polymerizable composition discharged from the preparation tank to a mixing tank, a step of stirring and re-mixing the polymerizable composition in the mixing tank, and a step of injecting the re-mixed polymerizable composition into the lens casting mold.

7. The process for producing a plastic lens according to claim 1,
wherein the polymerization reactive compound includes a polyiso(thio)cyanate compound and a bifunctional or higher active hydrogen compound.

8. The process for producing a plastic lens according to claim 1,
wherein a viscosity of the polymerizable composition in the step of injecting into the lens casting mold is 10 to 1,000 mPa·s at 20° C.

9. A process for producing a plastic lens comprising:
a step of stirring and mixing a solution including a polymerization reactive compound in a preparation tank;

a step of transferring a polymerizable composition obtained in the step from the preparation tank to a lens casting mold;

a step of curing the polymerizable composition; and a step of separating a cured resin from the lens casting mold to obtain a plastic lens molded product, wherein the step of transferring the polymerizable composition includes a step of re-mixing the polymerizable composition discharged from the preparation tank and injecting the polymerizable composition into the lens casting mold, and wherein the solution in the preparation tank further includes an ester compound represented by General Formula (1b) and an ether compound represented by General Formula (3b)

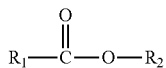 (1b)

wherein, in General Formula (1b), $R_1$ represents a hydrogen atom, a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms having one or more unsaturated bonds, and $R_2$ represents a polyoxyalkylene group represented by General Formula (2b);

—$(CH_2CHR_3O)_n$H (2b)

wherein, in General Formula (2b), a plurality of present $R_3$'s may be the same as or different from each other and each represents a hydrogen atom or a methyl group, and n represents an integer of 2 to 20, and $R_4$—O—$R_5$ (3b)

wherein, in General Formula (3b), $R_4$ represents a linear alkyl group having 1 to 20 carbon atoms, a branched alkyl group having 3 to 20 carbon atoms, a linear hydrocarbon group having 2 to 20 carbon atoms and having one or more unsaturated bonds, or a branched hydrocarbon group having 3 to 20 carbon atoms and having one or more unsaturated bonds, $R_5$ represents a linear alkyl group having 1 to 20 carbon atoms, a branched alkyl group having 3 to 20 carbon atoms, or a (poly)oxyalkylene group represented by General Formula (4b);

—$(CH_2CHR_6O)_m$H (4b)

wherein, in General Formula (4b), a plurality of present $R_6$'s may be the same as or different from each other and each represents a hydrogen atom or a methyl group, and m represents an integer of 1 to 20, wherein the polymerization reactive compound is at least one compound selected from the group consisting of a polyiso(thio)cyanate compound, a (thio)epoxy compound, an oxetanyl compound, a thietanyl compound, a bifunctional or higher active hydrogen compound, and an acid anhydride.

* * * * *